US012603040B2

(12) United States Patent
Seo et al.

(10) Patent No.: US 12,603,040 B2
(45) Date of Patent: Apr. 14, 2026

(54) PIXEL CIRCUIT AND DISPLAY DEVICE INCLUDING THE SAME

(71) Applicant: LG Display Co., Ltd., Seoul (KR)

(72) Inventors: Dae Young Seo, Paju-si (KR); Byung Hyun Lee, Paju-si (KR); Min Seok Kim, Paju-si (KR); Tae Yong Kim, Paju-si (KR); Su Min Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/966,026

(22) Filed: Dec. 2, 2024

(65) Prior Publication Data

US 2025/0259591 A1 Aug. 14, 2025

(30) Foreign Application Priority Data

Feb. 8, 2024 (KR) ........................ 10-2024-0019367

(51) Int. Cl.
*G09G 3/32* (2016.01)
*G09G 3/3233* (2016.01)
*G09G 3/3266* (2016.01)
*G09G 3/3291* (2016.01)

(52) U.S. Cl.
CPC ............. *G09G 3/32* (2013.01); *G09G 3/3233* (2013.01); *G09G 3/3266* (2013.01); *G09G 3/3291* (2013.01); *G09G 2310/0267* (2013.01); *G09G 2310/0275* (2013.01); *G09G 2330/021* (2013.01)

(58) Field of Classification Search
CPC ....... G02B 27/0172; G06F 3/012; G06T 7/20; G06T 7/75; G06T 19/006; G06V 20/56; G06V 20/59
See application file for complete search history.

(56) References Cited

U.S. PATENT DOCUMENTS

| | | | | |
|---|---|---|---|---|
| 11,908,412 | B1 * | 2/2024 | Fan | G09G 3/3233 |
| 2018/0122304 | A1 * | 5/2018 | Kim | G09G 3/3258 |
| 2018/0151118 | A1 * | 5/2018 | Chung | H10K 59/1213 |
| 2025/0104603 | A1 * | 3/2025 | Hwang | G09G 3/22 |

FOREIGN PATENT DOCUMENTS

| | | | |
|---|---|---|---|
| KR | 10-2006-0022510 | A | 3/2006 |
| KR | 10-0658266 | B1 | 12/2006 |
| KR | 10-2020-0043358 | A | 4/2020 |

* cited by examiner

*Primary Examiner* — Dmitriy Bolotin
(74) *Attorney, Agent, or Firm* — Fenwick & West LLP

(57) ABSTRACT

The present disclosure relates to a pixel circuit and a display device including the same, including a light-emitting element; a driving transistor connected to the light-emitting element; a first-first switch transistor connected between a gate electrode of the driving transistor and a data line to which a data voltage is applied and turned on in response to a pulse of a second scan signal; and a first-second switch transistor connected between the gate electrode of the driving transistor and the data line and turned on in response to a pulse of a first scan signal input prior to the pulse of the second scan signal.

16 Claims, 21 Drawing Sheets

PIXEL CIRCUIT AND DISPLAY DEVICE INCLUDING THE SAME

CROSS-REFERENCE TO RELATED APPLICATION

This application claims priority to and the benefit of Republic of Korea Patent Application No. 10-2024-0019367, filed Feb. 8, 2024, which is hereby incorporated by reference in its entirety.

BACKGROUND

Field

The present disclosure relates to a pixel circuit and a display device including the same.

Description of Related Art

Various flat panel display devices, such as a liquid crystal display device and an electroluminescent display device, are known. The electroluminescent display device may use light emitting elements arranged in each pixel to emit light by itself without a backlight, thereby displaying an input image. The light emitting elements of the electroluminescent display device may be divided into an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, excellent luminous efficiency, and impact resistance.

To increase the charging rate of the data voltage applied to the pixels of the display device, the pulse width and phase of the gate signal may be increased so as to overlap the pulses of the sequentially shifted gate signal. However, this method increases the number of clocks input to the gate driving circuit in consideration of signal interference between pixel lines. As a result, the method of overlapping the pulses of the gate signal may result in a large non-display area of the display panel, for example, a bezel area.

SUMMARY

An object of the present disclosure is to solve the above-described necessity and/or problem.

The present disclosure provides a pixel circuit capable of improving the charging rate of pixels without increasing a non-display area and a display device including the same.

The problems of the present disclosure are not limited to the above-mentioned problems, and other problems not mentioned will be clearly understood by those skilled in the art from the following description.

A pixel circuit according to one embodiment of the present disclosure includes a light-emitting element; a driving transistor electrically connected to the light-emitting element; a first-first switch transistor connected between a gate electrode of the driving transistor and a data line to which a data voltage is applied and turned on in response to a pulse of a second scan signal; and a first-second switch transistor connected between the gate electrode of the driving transistor and the data line and turned on in response to a pulse of a first scan signal input prior to a pulse of the second scan signal.

The first-first switch transistor may be turned on after the first-second switch transistor is turned on, and then the first-first switch transistor may be turned off after the first-second switch transistor is turned off.

The pulse of the first scan signal and the pulse of the second scan signal may overlap or do not overlap each other.

The gate electrode of the driving transistor may be connected to a first node, the driving transistor may include a first electrode connected to a second node and a second electrode to which a ground voltage is applied. The light-emitting element may include an anode electrode to which a pixel driving voltage is applied, and a cathode electrode connected to the second node. A voltage charging time of the first node may be longer than a pulse width of each of the first scan signal and the second scan signal.

The pixel circuit may further include a second-first switch transistor connected between a power line to which a reference voltage is applied and the second node and configured to be turned on in response to the pulse of the second scan signal; and a second-second switch transistor connected between the power line and the second node and configured to be turned on in response to the pulse of the first scan signal. The second-first switch transistor is turned on after the second-second switch transistor may be turned on, and then the second-first switch transistor may be turned off after the second-second switch transistor is turned off.

A pixel circuit according to another embodiment of the present disclosure includes a driving transistor including a gate electrode connected to a first node, a first electrode connected to a second node, and a second electrode connected to a third node; a light-emitting element including an anode electrode to which a pixel driving voltage is applied and a cathode electrode connected to the second node; a first capacitor connected between the first node and a fourth node; a first-first switch transistor connected between a data line to which a data voltage is applied and the fourth node and configured to be turned on in response to a pulse of a fourth scan signal; a first-second switch transistor connected between the data line and the fourth node and configured to be turned on in response to a pulse of a third scan signal input prior to the pulse of the fourth scan signal; a second-first switch transistor connected between the first node and the third node and configured to be turned on in response to the pulse of the fourth scan signal; and a second-second switch transistor connected between the first node and the third node and configured to be turned on in response to the pulse of the third scan signal.

The pulse of the third scan signal and the pulse of the fourth scan signal may overlap or do not overlap each other. A voltage charging time of the fourth node may be longer than a pulse width of each of the third scan signal and the fourth scan signal.

The pixel circuit may further include a third-first switch transistor connected between a first power line to which the pixel driving voltage is applied and the second node and configured to be turned on in response to the pulse of the fourth scan signal; and a third-second switch transistor connected between the first power line and the second node and configured to be turned on in response to the pulse of the third scan signal.

The pixel circuit may further include a fourth-first switch transistor connected between a third power line to which a reference voltage is applied and the third node and configured to be turned on in response to a pulse of a second scan signal; a fourth-second switch transistor connected between the third power line and the third node and configured to be turned on in response to a pulse of a first scan signal input prior to the second scan signal; a fifth switch transistor connected between the fourth node and the third power line and configured to be turned on in response to an emission signal; and a sixth switch transistor connected between a second power line to which a ground voltage is applied and the third node and configured to be turned on in response to the emission signal.

A display device according to one embodiment of the present disclosure includes a display panel in which a plurality of data lines, a plurality of gate lines, a plurality of power lines, and a plurality of sub-pixels are arranged; a data driver configured to output a data voltage to the data lines; and a gate driver configured to output a scan signal to the gate lines. Each of the sub-pixels includes a light-emitting element; a driving transistor electrically connected to the light-emitting element; a first-first switch transistor connected between a gate electrode of the driving transistor and the data line to which the data voltage is applied and configured to be turned on in response to a pulse of a second scan signal; and a first-second switch transistor connected between the gate electrode of the driving transistor and the data line and configured to be turned on in response to a pulse of a first scan signal input prior to the pulse of the second scan signal.

The first-first switch transistor may be turned on after the first-second switch transistor is turned on, and then the first-first switch transistor may be turned off after the first-second switch transistor is turned off. The pulse of the first scan signal and the pulse of the second scan signal may overlap or do not overlap each other.

The gate electrode of the driving transistor may be connected to a first node. The driving transistor may include a first electrode connected to a second node and a second electrode to which a ground voltage is applied. The light-emitting element may include an anode electrode to which a pixel driving voltage is applied, and a cathode electrode connected to the second node. A voltage charging time of the first node may be longer than a pulse width of each of the first scan signal and the second scan signal.

The display device may further include a second-first switch transistor connected between the power line to which a reference voltage is applied and the second node and configured to be turned on in response to the pulse of the first scan signal; and a second-second switch transistor connected between the power line and the second node and configured to be turned on in response to the pulse of the second scan signal. The second-first switch transistor may be turned on after the second-second switch transistor is turned on, and then the second-first switch transistor may be turned off after the second-second switch transistor is turned off.

A display device according to another embodiment of the present disclosure includes a display panel in which a plurality of data lines, a plurality of gate lines, a plurality of power lines, and a plurality of sub-pixels are arranged; a data driver configured to output a data voltage to the data lines; and a gate driver configured to output a scan signal to the gate lines. Each of the sub-pixels includes a driving transistor including a gate electrode connected to a first node, a first electrode connected to a second node, and a second electrode connected to a third node; a light-emitting element including an anode electrode to which a pixel driving voltage is applied and a cathode electrode connected to the second node; a first capacitor connected between the first node and a fourth node; a first-first switch transistor connected between the data line to which the data voltage is applied and the fourth node and configured to be turned on in response to a pulse of a fourth scan signal; a first-second switch transistor connected between the data line and the fourth node and configured to be turned on in response to a pulse of a third scan signal input prior to the pulse of the fourth scan signal; a second-first switch transistor connected between the first node and the third node and configured to be turned on in response to the pulse of the fourth scan signal; a second-second switch transistor connected between the first node and the third node and configured to be turned on in response to the pulse of the third scan signal; a third-first switch transistor connected between a first power line to which the pixel driving voltage is applied and the second node and configured to be turned on in response to the pulse of the fourth scan signal; a third-second switch transistor connected between the first power line and the second node and configured to be turned on in response to the pulse of the third scan signal; a fourth-first switch transistor connected between a third power line to which a reference voltage is applied and the third node and configured to be turned on in response to a pulse of a second scan signal; and a fourth-second switch transistor connected between the third power line and the third node and configured to be turned on in response to a pulse of a first scan signal input prior to the second scan signal.

The pulse of the third scan signal and the pulse of the fourth scan signal may overlap or do not overlap each other. A voltage charging time of the fourth node may be longer than a pulse width of each of the third scan signal and the fourth scan signal.

The pulse of the first scan signal and the pulse of the second scan signal may overlap or do not overlap each other.

The gate lines may include a first gate line to which the first scan signal is input; a second gate line to which the second scan signal is input; a third gate line to which the third scan signal is input; and a fourth gate line to which the fourth scan signal is input. Each of the first to fourth gate lines is connected in parallel to a corresponding output terminal of the gate driver.

The display device may further include a fifth switch transistor connected between the fourth node and the third power line and configured to be turned on in response to an emission signal; and a sixth switch transistor connected between a second power line to which a ground voltage is applied and the third node and configured to be turned on in response to the emission signal. The gate driver may output the emission signal.

According to an embodiment of the present disclosure, a charging time of a data voltage charged in a pixel circuit may be made longer than a pulse width of a gate signal. As a result, the present disclosure may drive pixels with high efficiency and high luminance, enabling improved lifetime and low power driving, may reduce an output voltage of the data driver due to an effect of improving a charging rate of the pixel circuit, reducing power consumption and heat generation amount of the data driver, and may reduce the number of clock wires input to the gate driver, thereby improving the charging rate of pixels without increasing a non-display area.

The present disclosure may provide a charging rate improvement effect such as an overlapping pulse of a gate signal by applying non-overlapping pulses of a gate signal to sub-pixels.

According to the present disclosure, by applying a wire structure in which neighboring pixel lines shares gate lines, the number of channels of the gate driver may be reduced, thereby further reducing the size of the non-display area.

The effects of the present disclosure are not limited to the above-mentioned effects, and other effects not mentioned will be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
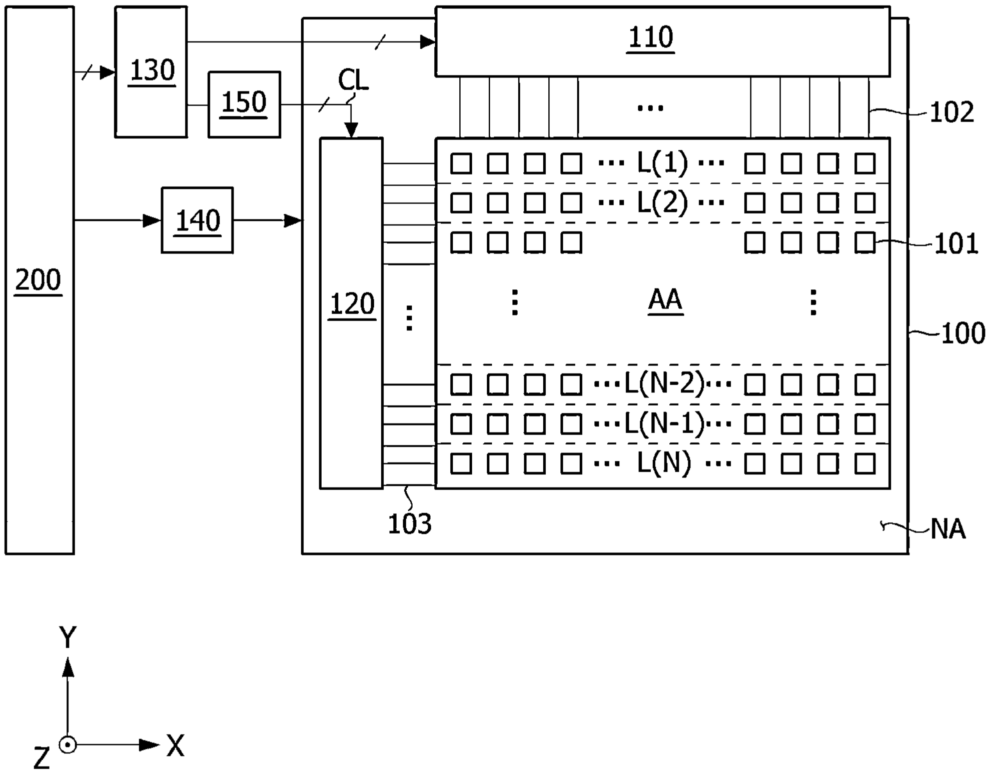
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit of the display device may include a plurality of transistors. A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Referring to FIG. 1, a display device according to one embodiment of the present disclosure includes a display panel 100, a display panel driving circuit for writing pixel data to pixels 101 of the display panel 100, and a power supply 140 that generates power required to drive the pixels 101 and the display panel driving circuit.

A substrate of the display panel 100 may be a plastic substrate, a thin glass substrate, or a metal substrate, but is not limited thereto. The display panel 100 may be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 may have a curved perimeter.

The display panel 100 may be implemented as a non-transmissive display panel or a transmissive display panel. The transmissive display panel may be applied to a transparent display device in which an image is displayed on a screen and a real object is visible beyond the display panel. The display panel 100 may be manufactured as a flexible display panel. In addition, the display panel 100 may be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 may further include power lines connected in common to the pixels 101. The power lines are connected in common to the pixels 101 to supply the pixels with a constant voltage required to drive the pixels 101. The power lines may be implemented as long stripe wires along the first direction or the second direction, or as mesh wires in which wires in the first direction and wires in the second direction are electrically connected.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light emitting element. The pixel circuits are connected to the data lines, the gate lines, and the power lines. Hereinafter, a “pixel” may be interpreted as a “sub-pixel”.

The pixel array includes a plurality of pixel lines L1 to Ln. Each of the pixel lines L1 to Ln includes one line of pixels arranged along a gate line direction (the X-axis direction) in the pixel array of the display panel 100. Pixels arranged in one pixel line may share the gate line 103. Pixels arranged in a column direction (the Y-axis direction) along a data line direction may share the same data line 102. One horizontal period is a time obtained by dividing one frame period by the total number of the pixel lines L1 to Ln.

The power supply 140 uses a DC-DC converter to generate a constant voltage (or a direct current (DC) voltage) required to drive the pixel array of the display panel 100 and the display panel driving circuit. The DC-DC converter may include a charge pump, a regulator, a buck converter, a boost converter, and the like. The power supply 140 may adjust the level of an input voltage inputted from a host system 200 to output constant voltages such as a gamma reference voltage, a data driving voltage, a gate low voltage, a gate high voltage, a pixel driving voltage, and a pixel base voltage. The gamma reference voltage and the data driving voltage are supplied to a data driver 110. The dynamic range of a data voltage outputted from the data driver 110 is determined by the voltage range of the gamma reference voltage. The dynamic range of the data voltage is a voltage range between the highest grayscale voltage and the lowest grayscale voltage.

The gate high voltage and the gate low voltage are supplied to a level shifter 150 and a gate driver 120. The constant voltages, such as the pixel driving voltage and the pixel base voltage, are supplied to the pixels 101 through the power lines connected in common to the pixels 101. The pixel driving voltage may be supplied to the display panel 100 from a main power source of the host system 200. In this case, the power supply 140 does not need to output the pixel driving voltage.

The display panel driving circuit writes pixel data of the input image to the pixels of the display panel 100 under the control of a timing controller 130. The display panel driving circuit includes the data driver 110 and the gate driver 120.

The display panel driving circuit may further include a touch sensor driver for driving touch sensors. The touch sensor driver is omitted in FIG. 1. The data driver 110 and the touch sensor driver may be integrated into a single drive integrated circuit (IC). The timing controller 130, the power supply 140, the level shifter 150, the data driver 110, the touch sensor driver, and the like may be further integrated into the drive IC.

The data driver 110 receives the pixel data of the input image received as a digital signal from the timing controller 130 and outputs the data voltage. The data driver 110 converts the pixel data of the input image into a gamma compensation voltage using a digital to analog converter (DAC) and outputs the data voltage. The gamma reference voltage is divided into gamma compensation voltages for each grayscale by a voltage divider circuit of the data driver 110 and supplied to the DAC. The DAC generates the data voltage with a gamma compensation voltage corresponding to a grayscale value of the pixel data. The data voltage outputted from the DAC is outputted to the data line 102 through an output buffer in each of data output channels of the data driver 110.

The gate driver 120 may be formed in the display panel 100 together with a TFT array of the pixel array and the wires. The gate driver 120 may be disposed in the non-display area NA outside the display area AA in the display panel 100, or at least a portion thereof may be disposed in the display area AA. When a circuit of the gate driver 120 may be disposed within a display area AA. In this case, the pixel circuits and light-emitting elements of the pixels 101 may overlap with the circuit of the gate driver 120 in the Z-axis direction of the display panel 100.

The gate driver 120 may be disposed in either a left non-display area NA or a right non-display area NA outside the display area AA in the display panel 100 to supply the gate signal to the gate lines 103 in a single feeding method. In the single feeding method, the gate signal is applied to one end of the gate lines. The gate driver 120 may be disposed in the left non-display area NA and the right non-display area NA in the display panel 100 to apply the gate signal to the gate lines 103 by a single feeding method or a double feeding method. In the double feeding method, the gate signal is applied simultaneously to both ends of the gate lines 103. At least some circuits of the gate driver 120 may be disposed within the display area AA.

The gate driver 120 may include a shift register and/or an edge trigger to output and shift the pulses of the gate signal under the control of the timing controller 130. The gate driver 120 may output a plurality of gate signals with different waveforms, such as the pulse of a scan signal and the pulse of an emission signal (hereinafter referred to as "EM signal"). In this case, the gate driver 120 may include, but is not limited to, a first gate driver that outputs the pulse of the scan signal and a second gate driver that outputs the pulse of the EM signal.

The timing controller 130 receives the pixel data of the input image and a timing signal synchronized with the pixel data from the host system 200. The timing signal may include a vertical synchronization signal Vsync, a horizontal synchronization signal Hsync, and a data enable signal DE. The vertical sync signal Vsync indicates one frame period including a pulse generated once every frame period. Pulses of the horizontal synchronization signal Hsync and the data enable signal DE may be one horizontal period (1H). The timing controller 130 may determine one frame period (or vertical period) and a horizontal period by counting the data enable signal DE. In this case, the vertical synchronization signal Vsync and the horizontal synchronization signal Hsync may be omitted.

The timing controller 130 may control the operation timings of the data driver 110 and the gate driver 120 based on the timing signals Vsync, Hsync, and DE received from the host system 200. The gate timing signal may include a start pulse and a clock to control the operation timings of the gate driver 120. The gate timing control signal outputted from the timing controller 130 may be inputted to the gate driver 120 through the level shifter 150 and may be used to control the pulse of the gate signal outputted from the gate driver 120. The level shifter 150 may receive the gate timing control signal and generate the start pulse and the clock to provide them to the gate driver 120. The input signal to the level shifter 150 is a signal of a digital signal voltage level. The start pulse and the clock outputted from the level shifter 150 may swing between the gate-high voltage and the gate-low voltage. The start pulse and the clock outputted from the level shifter 150 may be input to the gate driver 120 through clock wires CL.

The clock inputted to the gate driver 120 may be sequentially shifted as shown in FIGS. 4A to 5B. The pulse of the (n)th (where n is a natural number) clock inputted to the gate drive 120 may or may not overlap the pulses of the (n−1)th clock and the (n+1)th clocks.

The host system 200 may scale an image signal from a video source to match the resolution of the display panel 100, and may transmit it to the timing controller 130 together with the timing control signal.

Figure 2:
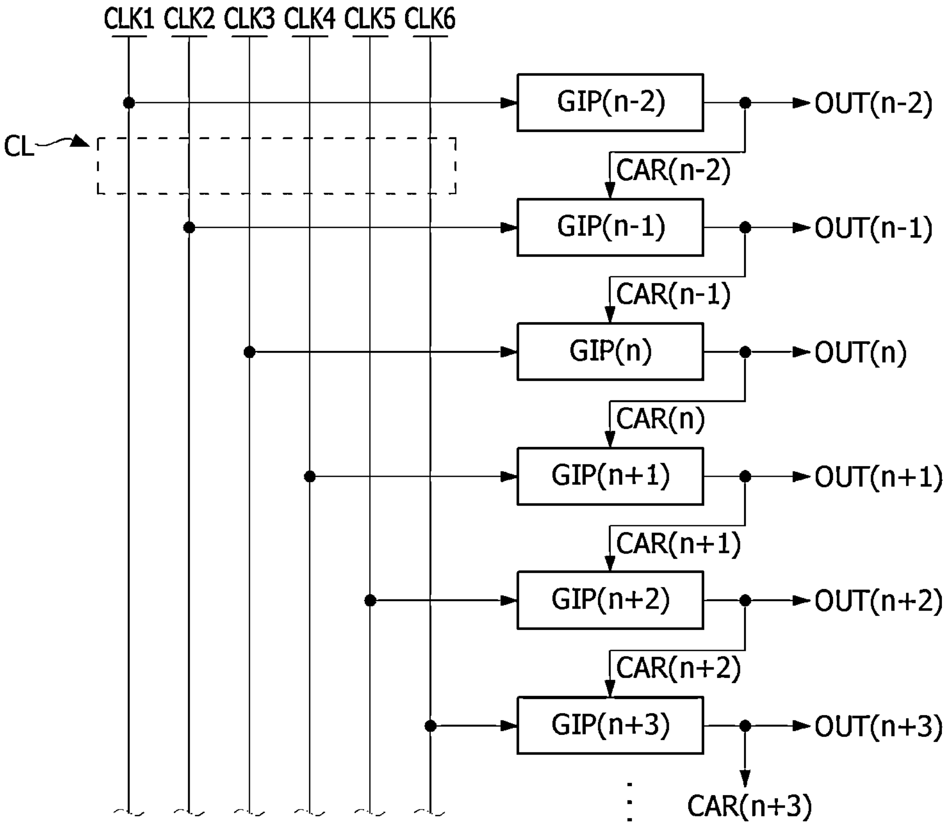
FIG. 2 is a block diagram schematically showing a gate driver according to one embodiment of the present disclosure.

FIG. 2 is a block diagram schematically illustrating the gate driver 120 according to one embodiment of the present disclosure.

Referring to FIG. 2, the gate driver 120 includes a plurality of signal transfer parts GIP(n−2) to GIP(n+3) that are commonly connected to the clock wires CL and are cascaded through carry signal wires.

The signal transfer parts GIP(n−2) to GIP(n+3) are connected to the clock wires CL to receive the clocks CLK1 to CLK6. The clocks CLK1 to CLK6 may be six-phase clocks, in which pulses are sequentially shifted, as shown in FIGS. 4A to 5B, but are not limited thereto. For example, the clocks CLK1 to CLK6 may be n-phase clocks.

Each of the signal transfer parts GIP(n−2) to GIP(n+3) includes an input node to which a start pulse or carry signals CAR(n−2) to CAR(n+3) are inputted, a CLK node to which clocks CLK1 and CLK2 are inputted, an output node from which gate signals OUT(n−2) to OUT(n+3) are outputted, and a carry output node from which carry signals CAR(n−2) to CAR(n+3) are outputted. The gate signals OUT(n−2) to OUT(n+3) and the carry signals CAR(n−2) to CAR(n+3) may be outputted through one output node, or may be outputted through different output nodes. The gate signals OUT(n−2) to OUT(n+3) outputted from the gate driver 120 may be scan signals or EM signals.

The start pulse may be input to the first signal transfer part, which is omitted in the drawing. Each of the signal transfer parts GIP(n−2) to GIP(n+3) may be driven by receiving carry signals CAR(n−2) to CAR(n+3) from the previous signal transfer part as the start pulse. The (n−1)th signal transfer part GIP(n−1) may receive the (n−2)th carry signal CAR(n−2) and the second clock CLK2 and simultaneously output the (n−1)th gate signal OUT(n−1) and the (n−1)th carry signal CAR(n−1). Subsequently, the (n)th signal transmission unit GIP(n) may receive the (n−1)th carry signal CAR(n−1) and the third clock CLK3 and simultaneously output the (n)th gate signal OUT(n) and the (n)th carry signal CAR(n).

Figure 3:
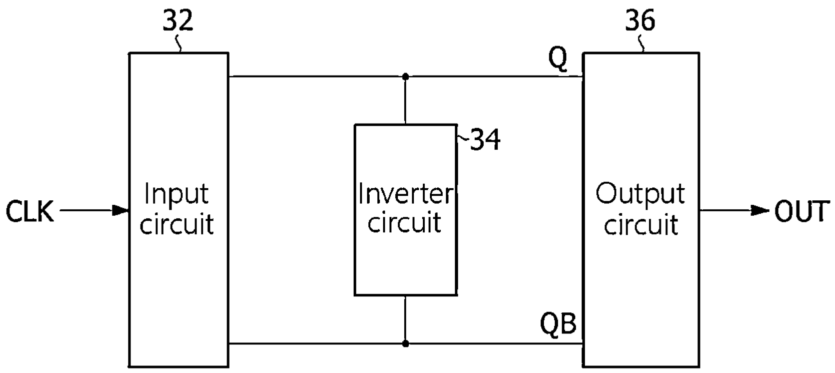
FIG. 3 is a block diagram schematically showing the configuration of a signal transfer part of the gate driver according to one embodiment of the present disclosure.

FIG. 3 is a block diagram schematically showing the configuration of the signal transfer part of the gate driver 120 according to one embodiment of the present disclosure.

Referring to FIG. 3, each of the signal transfer parts GIP(n−2) to GIP(n+3) may include an input circuit 32, an inverter circuit 34, and an output circuit 36.

The input circuit 32 charges and discharges a first control node Q in response to the start pulse or the carry signal. The inverter circuit 34 discharges a second control node QB when the first control node Q is charged, and charges the second control node QB when the first control node Q is discharged.

The output circuit 36 causes a pulse of the gate signal OUT to rise a gate-on voltage according to the voltage of the first control node Q, and causes a pulse of the gate signal OUT to fall to a gate-off voltage according to the voltage of the second control node QB. The pulse of the gate signal OUT is simultaneously applied to the sub-pixels disposed on one pixel line through the gate line. In the sub-pixels, when the switch transistor of the pixel circuit controlled by the gate signal OUT is the p-channel transistor, the gate-on voltage may be the gate low voltage VGL illustrated in FIG. 6, and the gate-off voltage may be the gate high voltage VGH. When the switch transistor of the pixel circuit is an n-channel transistor, the gate-on voltage may be the gate high voltage VGH illustrated in FIG. 7, and the gate-off voltage may be the gate low voltage VGL.

Figure 4A:
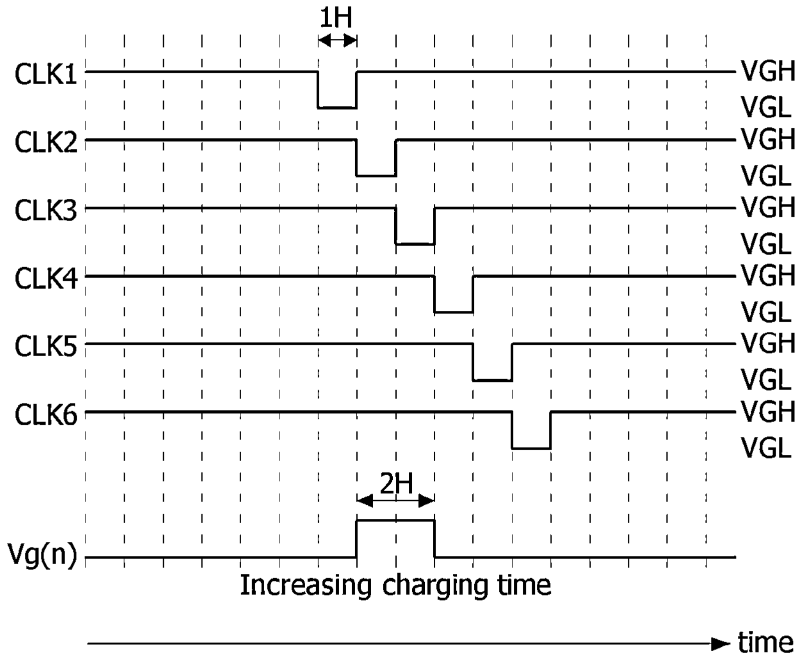
FIGS. 4A and 4B are waveform diagrams illustrating one example of a clock input to a gate driver when a switch transistor of a pixel circuit is a p-channel transistor according to one embodiment of the present disclosure.
Figure 4B:
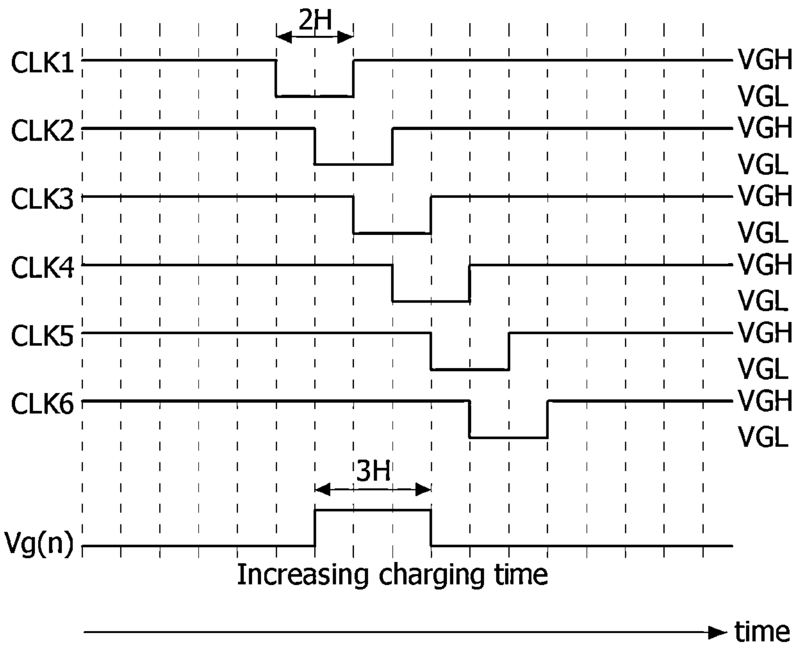
Figure 5A:
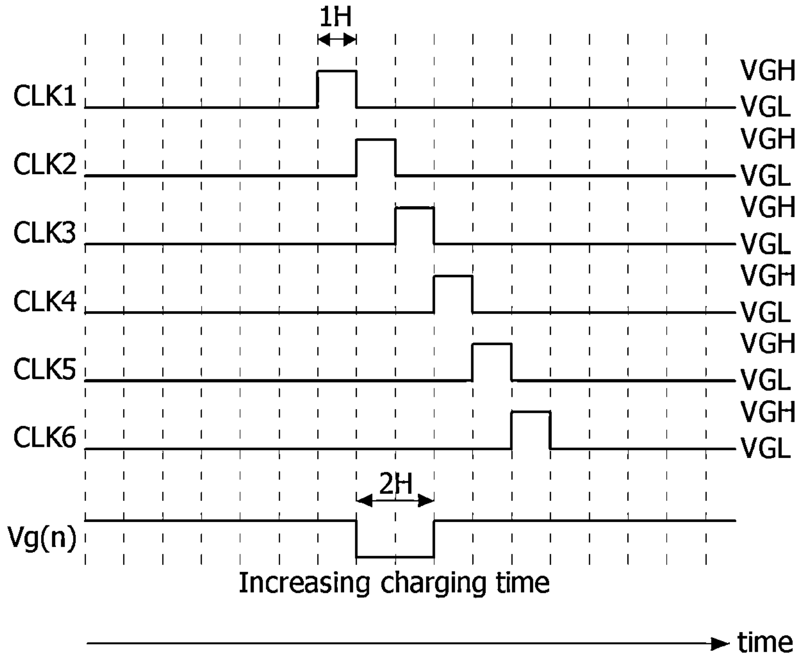
FIGS. 5A and 5B are waveform diagrams illustrating one example of a clock input to a gate driver when a switch transistor of a pixel circuit is an n-channel transistor according to one embodiment of the present disclosure.
Figure 5B:
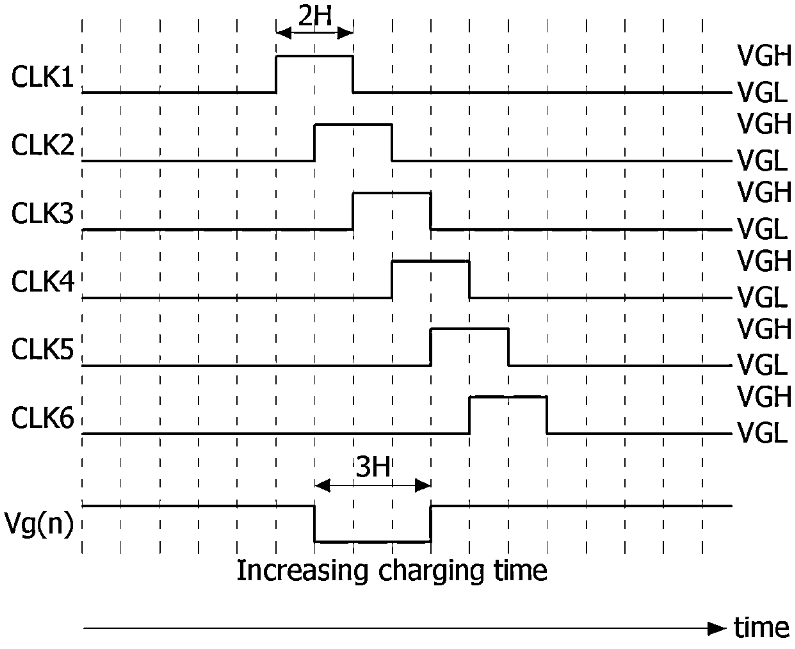

FIGS. 4A and 4B are waveform diagrams illustrating one example of a clock input to a gate driver in a case where a switch transistor of a pixel circuit is a p-channel transistor according to one embodiment of the present disclosure. FIGS. 5A and 5B are waveform diagrams illustrating one example of a clock input to a gate driver in a case where a switch transistor of a pixel circuit is an n-channel transistor according to one embodiment of the present disclosure.

Referring to FIGS. 4A to 5B, the clocks CLK1 to CLK6 may be sequentially shifted. The pulse voltage of the clocks CLK1 to CLK6 may be the gate low voltage VGL as shown in FIGS. 4A and 4B, or the gate high voltage VGH as shown in FIGS. 5A and 5B.

The pulses of the clocks CLK1 to CLK6 may be outputted as non-overlapping waveforms. For example, the (n)th clock may have a pulse width that does not overlap with the (n−1)th clock and the (n+1)th clock. In this case, the pulse width of the clocks CLK1 to CLK6 may be 1 horizontal period 1H, as shown in FIGS. 4A and 5A, but is not limited thereto.

The pulses of the neighboring clocks CLK1 to CLK6 may overlap each other. For example, the (n)th clock may overlap with the second half of the (n−1)th clock, and may overlap with the first half of the (n+1)th clock. In this case, the pulse width of the clocks CLK1 to CLK6 may be 2 horizontal periods 2H as shown in FIGS. 4B and 5B, and the overlapping width may be 1 horizontal period 1H, but is not limited thereto.

FIGS. 4A and 4B are waveform diagrams illustrating one example of a clock input to a gate driver in a case where a switch transistor of a pixel circuit is a p-channel transistor. FIGS. 5A and 5B are waveform diagrams illustrating one example of a clock input to a gate driver in a case where a switch transistor of a pixel circuit is an n-channel transistor. FIG. 6 is a waveform diagram illustrating one example of gate signals, for example, scan signals SCAN(n−1) to SCAN (n+1), sequentially output from the gate driver 120 when clocks CLK1 to CLK6 as shown in FIG. 4A are input to the gate driver 120. FIG. 7 is a waveform diagram illustrating one example of gate signals, for example, scan signals SCAN(n−1) to SCAN(n+1), sequentially output from the gate driver 120 when clocks CLK1 to CLK6 as shown in FIG. 5A are input to the gate driver 120.

Referring to FIGS. 4A to 5B, the clocks CLK1 to CLK6 may be sequentially shifted. The pulse voltages of the clocks CLK1 to CLK6 may be the gate low voltage VGL as shown in FIGS. 4A and 4B, or the gate high voltage VGH as shown in FIGS. 5A and 5B.

Figure 6A:
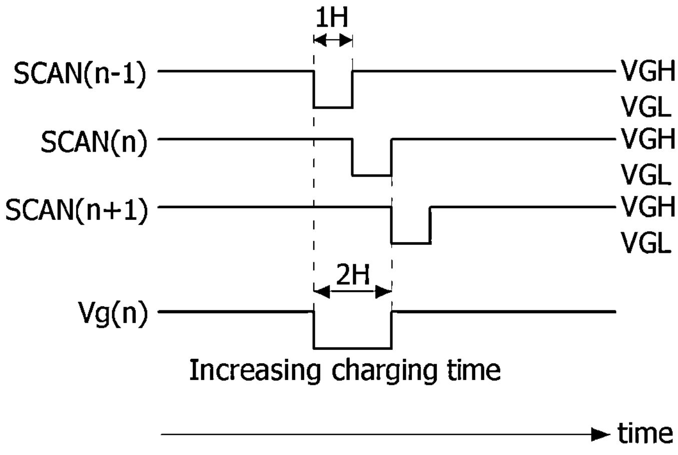
FIGS. 6A and 6B are waveform diagrams showing examples of gate signals sequentially output from the gate driver when the clocks as shown in FIGS. 4A and 4B are input to the gate driver according to one embodiment of the present disclosure.
Figure 7A:
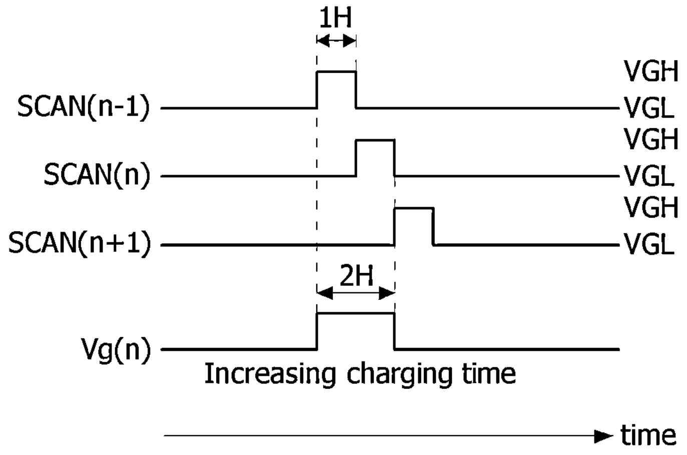
FIGS. 7A and 7B are waveform diagrams showing examples of gate signals sequentially output from the gate driver when the clocks as shown in FIGS. 5A and 5B are input to the gate driver according to one embodiment of the present disclosure.
Figure 7B:
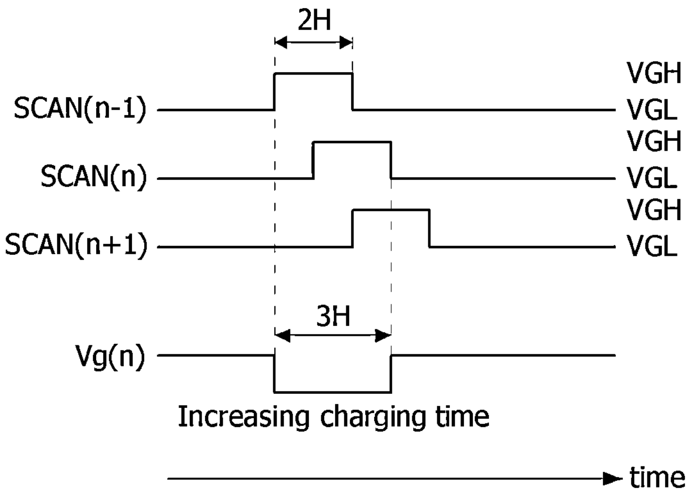

The pulses of the clock CLK1 to CLK6 may be output in a waveform that does not overlap. For example, the (n)th clock may have a pulse width that does not overlap the (n−1)th clock and the (n+1)th clock. In this case, the pulse width of the clocks CLK1 to CLK6 may be one horizontal period 1H as shown in FIGS. 4A and 5A, but is not limited thereto. When the pulses of the clocks CLK1 to CLK6 do not overlap with the pulses of other clocks, the pulses of the scan signals SCAN(n−1) to SCAN(n+1) sequentially output from the gate driver 120 do not overlap and have the same pulse width as those of the clocks CLK1 to CLK6 as shown in FIGS. 6A and 7B.

Figure 6B:
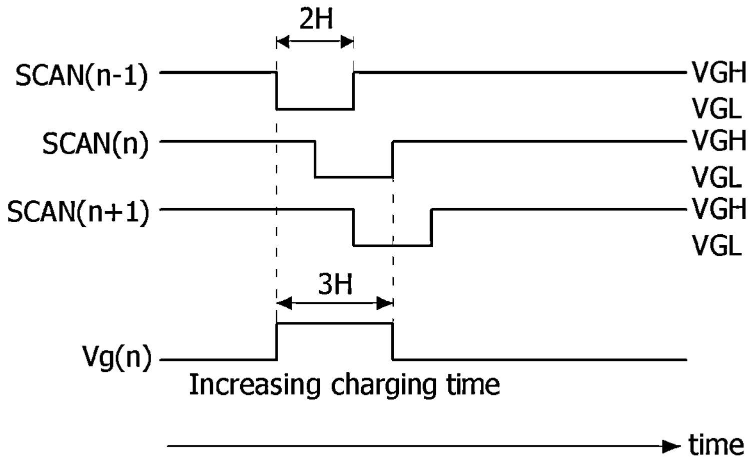

The pulses of the neighboring clocks CLK1 to CLK6 may overlap each other. For example, the (n)th clock may overlap with the second half of the (n−1)th clock, and may overlap with the first half of the (n+1)th clock. In this case, the pulse width of the clocks CLK1 to CLK6 may be 2 horizontal periods 2H as shown in FIGS. 4B and 5B, and the overlapping width may be 1 horizontal period 1H, but is not limited thereto. When the pulses of the clocks CLK1 to CLK6 overlap with the pulses of other clocks, the pulse widths of the scan signals SCAN(n−1) to SCAN(n+1) sequentially output from the gate driver 120 as shown in FIGS. 6B and 7B may have the same pulse width as those of the clocks CLK1 to CLK6, and may overlap with the pulses of other scan signals by the same overlapping width as the overlapping width of the pulses of the clock.

In FIGS. 4A to 7B, 'Vg' is a gate voltage of a driving transistor driving the light-emitting element in the pixel circuit. As shown in FIGS. 6A, 6B, 7A, and 7B, even though the pulses of the scan signals SCAN(n−1) to SCAN(n+1) do not overlap, the charging time of the gate voltage of the driving transistor becomes longer than the pulse widths of the scan signals SCAN(n−1) to SCAN(n+1). A gate electrode of the driving transistor is charged with a data voltage, and a capacitor connected to the gate electrode of the driving transistor is charged with the data voltage. Accordingly, the pixel circuit may be charged with a data voltage during a time period longer than the pulse width of the pulse of the scan signals SCAN(n−1) to SCAN(n+1). As a result, since the data voltage required for normal driving of the pixel circuit may be charged even if the pulse width of the scan signal is reduced, a dynamic range of the data voltage supplied to the pixel circuit may be reduced, enabling low power driving of the data driver and the display panel, thereby reducing power consumption and heat generation, and increasing the amount of current or current density flowing to the light-emitting element, thereby improving efficiency and luminance of the light-emitting element. Furthermore, since the clock may be non-overlapping, the number of clock wires may be reduced, and thus the non-display area of the display panel may be reduced.

Figure 8:
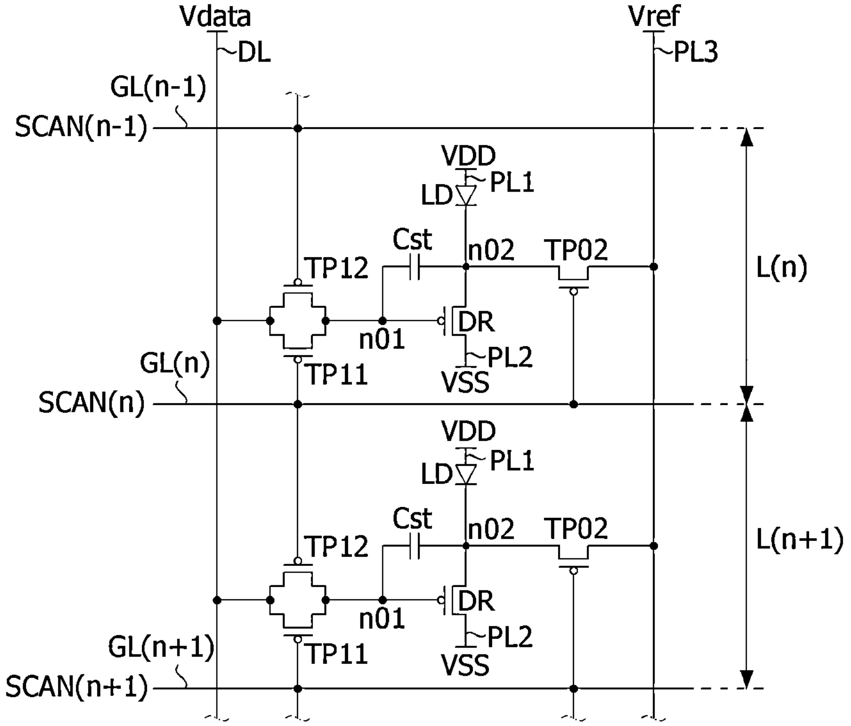
FIG. 8 is a circuit diagram illustrating a pixel circuit according to one embodiment of the present disclosure.

FIG. 8 is a circuit diagram illustrating a pixel circuit according to one embodiment of the present disclosure. The pixel circuit illustrated in FIG. 8 is one example of pixel circuits of a sub-pixel disposed in an (n)th pixel line L(n) and a sub-pixel disposed in an (n+1)th pixel line L(n+1). The scan signals SCAN(n−1) to SCAN(n+1) as illustrated in FIGS. 6A and 6B may be input to the pixel circuit illustrated in FIG. 8. The scan signals SCAN(n−1) to SCAN(n+1) may be input to the pixel circuit through gate lines GL(n−1) to GL(n+1). The (n−1)th scan signal SCAN(n−1) may be a first scan signal, and the (n)th scan signal SCAN(n) may be a second scan signal. The (n−1)th scan signal SCAN(n−1) and the (n)th scan signal SCAN(n) may include pulses that do not overlap each other or pulses that overlap each other.

Referring to FIG. 8, a pixel circuit may include a light-emitting element LD, a driving transistor DR, a plurality of switch transistors TP11 to TP02, and a capacitor Cst. Each of the driving transistor DR and the switch transistors TP11 to TP02 may be implemented as a p-channel transistor. The gate-on voltage, which is a pulse voltage of the scan signals SCAN(n−1) to SCAN(n+1) controlling the switch transistors TP11 to TP02, may be the gate low voltage VGL.

A data voltage Vdata, a pixel driving voltage VDD, a ground voltage VSS, a reference voltage Vref, a gate high voltage VGH and a gate low voltage VGL of a scan signal SCAN(n−1) to SCAN(n+1) may be applied to the pixel circuit. One example of the voltage applied to the pixel circuit may be Vdata=0 V to 10 V, VDD=9.5 V, VSS=0 V, VGH=13 V, and VGL=−7 V, but is not limited thereto.

The light-emitting element LD may include an anode electrode, a cathode electrode, and an emission layer. The anode electrode of the light-emitting element LD may be connected to the first power line PL1 to which the pixel driving voltage VDD is applied. The cathode electrode of the light-emitting element LD may be connected to the second node n02. The light-emitting element LD may be a light-emitting element such as an OLED, a mini-LED, or a micro LED, but is not limited thereto. In the case of the mini-LED or the micro-LED, it may be a vertical structure in which electrodes are disposed on top and bottom of the semiconductor chip in which the light-emitting element LD is integrated, but is not limited thereto. The semiconductor chip in which the light-emitting element LD is integrated may be implemented in a lateral structure or a flip chip structure.

The light-emitting element LD and the driving transistor DR may be connected in series between the pixel driving voltage VDD and the ground voltage VSS.

The driving transistor DR adjusts a current flowing through the drain-source channel according to the gate-source voltage. The gate-source voltage of the driving transistor DR varies according to the data voltage Vdata of pixel data applied to a gate electrode of the driving transistor DR. Accordingly, the current flowing through the driving transistor DR varies according to the data voltage Vdata. The light-emitting element LD may be driven by the current from the driving transistor DR to emit light.

The driving transistor DR may be connected between the light-emitting element LD and the ground voltage VSS. The driving transistor DR includes a gate electrode connected to the first node n01, a first electrode connected to the second node n02, and a second electrode connected to a second power line PL2 to which a ground voltage VSS is applied. The capacitor Cst is connected between the first node n01 and the second node n02 to charge a gate-source voltage of the driving transistor DR and maintain the charged voltage for a first frame period.

The first-first and first-second switch transistors TP11 and TP12 are connected between a data line DL to which the data voltage Vdata of pixel data is applied and the first node n01 to apply a data voltage Vdata to the first node n01 in response to pulses of two consecutive scan signals SCAN(n−1) to SCAN(n+1). The first-first and first-second switch transistors TP11 and TP12 are sequentially turned on and then sequentially turned off.

In the sub-pixels disposed in the (n)th pixel line L(n), the first-first switch transistor TP11 is turned on in response to the gate-on voltage VGL of the (n)th scan signal SCAN(n) to electrically connect the data line DL to the first node n01. The first-second switch transistor TP12 is turned on in response to the gate-on voltage VGL of the (n−1)th scan signal SCAN(n−1) to electrically connect the data line DL to the first node n01. The (n−1)th scan signal SCAN(n−1) is output from the gate driver 120, followed by the (n)th scan signal SCAN(n). As a result, since the first-first switch transistor TP11 is turned on after the first-second switch transistor TP12 is turned on, the data voltage Vdata is applied to the first node n01 for a time longer than the pulse width of each of the scan signals SCAN(n−1) and SCAN(n) so that the charging time of the data voltage Vdata may increase. In FIGS. 6A and 6B, 'Vg (n)' is a voltage of the first node n01, that is, a gate voltage of the driving transistor DR.

In the sub-pixels disposed in the (n)th pixel line L(n), the first-first switch transistor TP11 includes a first electrode connected to the data line DL, a gate electrode connected to the (n)th gate line GL(n) to which the (n)th scan signal SCAN(n) is applied, and a second electrode connected to the first node n01. The first-second switch transistor TP12 includes a first electrode connected to the data line DL, a gate electrode connected to the (n−1)th gate line GL(n−1) to which the (n−1)th scan signal SCAN(n−1) is applied, and a second electrode connected to the first node n01.

In the sub-pixels disposed in the (n)th pixel line L(n), the second switch element TP02 is turned on in response to the gate-on voltage VGL of the (n)th scan signal SCAN(n). When the second switch element TP02 is turned on, the second node n02 may be electrically connected to the third power line PL3 to which the reference voltage Vref is applied. In the sub-pixels disposed in the (n)th pixel line L(n), the second switch element TP02 includes a first electrode connected to the third power line PL3, a gate electrode connected to the (n)th gate line GL(n) to which the (n)th scan signal SCAN(n) is applied, and a second electrode connected to the second node n02.

An external compensation circuit may be connected to the third power line PL3. The external compensation circuit may sense the electrical characteristics of the driving transistor DR, such as threshold voltage and mobility, and modulate the pixel data (digital data) of the input image by the deviation (or change) in the electrical characteristics of the driving transistor DR to compensate for the deviation (or change) in the electrical characteristics of the driving transistor DR at each of the pixels in real time.

Figure 9:
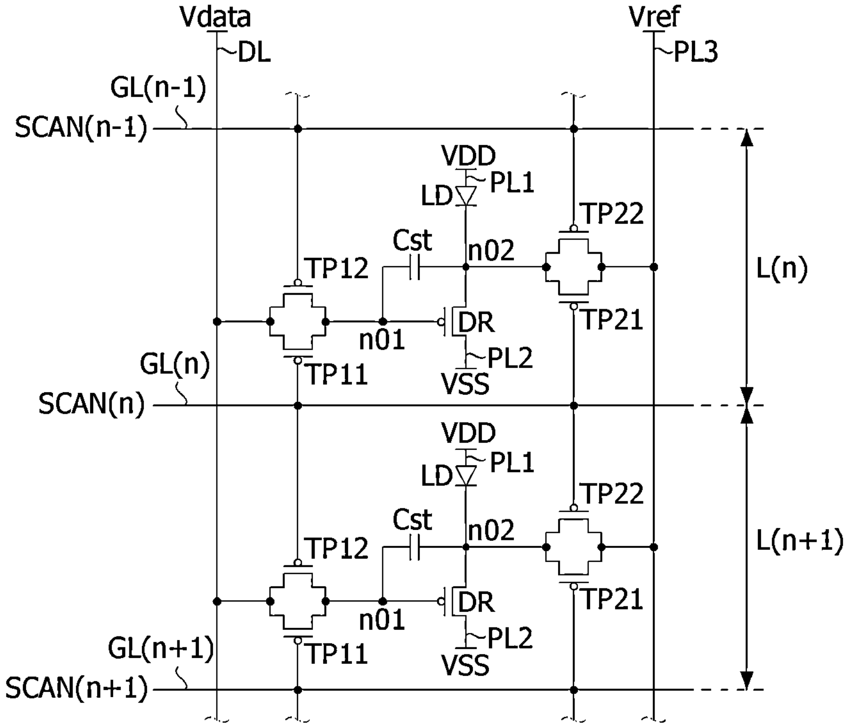
FIG. 9 is a circuit diagram illustrating a pixel circuit according to another embodiment of the present disclosure.

FIG. 9 is a circuit diagram illustrating a pixel circuit according to another embodiment of the present disclosure. In this embodiment, substantially the same redundant description as the embodiment illustrated in FIG. 8 is omitted. The scan signals SCAN(n−1) to SCAN(n+1) as illustrated in FIGS. 6A and 6B may be input to the pixel circuit illustrated in FIG. 9.

Referring to FIG. 9, the pixel circuit may further include second-first and second-second switch transistors TP21 and TP22.

After the second-second switch transistor TP22 is turned on in response to the pulse of the (n−1)th scan signal SCAN(n−1), the second-first switch transistor TP21 may be turned on in response to the pulse of the (n)th scan signal SCAN(n). Subsequently, after the second-second switch transistor TP22 is turned off in response to the gate-off voltage of the (n−1)th scan signal SCAN(n−1), the second-first switch transistor TP21 may be turned off in response to the gate-off voltage of the (n)th scan signal SCAN(n).

In the sub-pixels disposed in the (n)th pixel line L(n), the second-first switch transistor TP21 is turned on in response to the gate-on voltage VGL of the (n)th scan signal SCAN(n) to electrically connect the third power line PL3 to which the reference voltage Vref is applied to the second node n02. The second-second switch transistor TP22 is turned on in response to the gate-on voltage VGL of the (n−1)th scan signal SCAN(n−1) to electrically connect the third power line PL3 to the second node n02.

In the sub-pixels disposed in the (n)th pixel line L(n), the second-first switch element TP21 includes a first electrode connected to the third power line PL3, a gate electrode connected to the (n)th gate line GL(n) to which the (n)th scan signal SCAN(n) is applied, and a second electrode connected to the second node n02. The second-second switch element TP22 includes a first electrode connected to the third power line PL3, a gate electrode connected to the (n−1)th gate line GL(n−1) to which the (n−1)th scan signal SCAN(n−1) is applied, and a second electrode connected to the second node n02.

Figure 10:
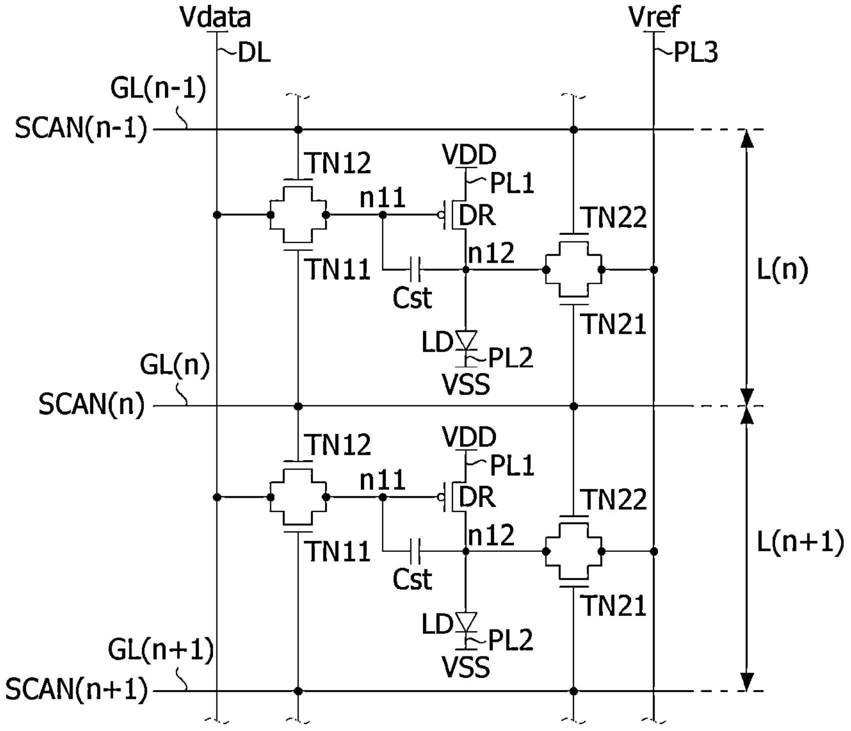
FIG. 10 is a circuit diagram illustrating a pixel circuit according to another embodiment of the present disclosure.

FIG. 10 is a circuit diagram illustrating a pixel circuit according to another embodiment of the present disclosure. In the embodiment, redundant descriptions that are substantially the same as the embodiments shown in FIGS. 8 and 9 are omitted. The scan signals SCAN(n−1) to SCAN(n+1) as illustrated in FIGS. 7A and 7B may be input to the pixel circuit illustrated in FIG. 10.

Referring to FIG. 10, the pixel circuit may include a light-emitting element LD, a driving transistor DR, a plurality of switch transistors TN11 to TN22, and a capacitor Cst. Each of the driving transistor DR and the switch transistors TN11 to TN22 may be implemented as an n-channel transistor. The gate-on voltage of the scan signals SCAN(n−1) to SCAN(n+1) controlling the switch transistors TP11 to TP02 may be the gate high voltage VGH.

The light-emitting element LD includes an anode electrode connected to the second node n12 and a cathode electrode connected to the second power line PL2 to which the ground voltage VSS is applied. The driving transistor DR includes a first electrode connected to the first power line PL1 to which the pixel driving voltage VDD is applied, a gate electrode connected to the first node n11, and a second electrode connected to the second node n12. The capacitor Cst is connected between the first node n11 and the second node n12.

The first-first and first-second switch transistors TN11 and TN12 may be connected between the data line DL and the first node n11 and may be sequentially turned on. In sub-pixels disposed in the (n)th pixel line L(n), the first-first switch transistor TN11 includes a first electrode connected to the data line DL, a gate electrode connected to the (n)th gate line GL(n) to which the (n)th scan signal SCAN(n) is applied, and a second electrode connected to the first node n11. The first-second switch transistor TN12 includes a first electrode connected to the data line DL, a gate electrode connected to the (n−1)th gate line GL(n−1) to which the (n−1)th scan signal SCAN(n−1) is applied, and a second electrode connected to the first node n11.

The second-first and second-second switch transistors TN21 and TN22 may be connected between the second node n12 and the third power line PL3 and may be sequentially turned on. In sub-pixels disposed in the (n)th pixel line L(n), the second-first switch element TN21 includes a first electrode connected to the third power line PL3 to which the reference voltage Vref is applied, a gate electrode connected to the (n)th gate line GL(n) to which the (n)th scan signal SCAN(n) is applied, and a second electrode connected to the second node n12. The second-second switch element TN22 includes a first electrode connected to the third power line PL3, a gate electrode connected to the (n−1)th gate line GL(n−1) to which the (n−1)th scan signal SCAN(n−1) is applied, and a second electrode connected to the second node n12.

Figure 11:
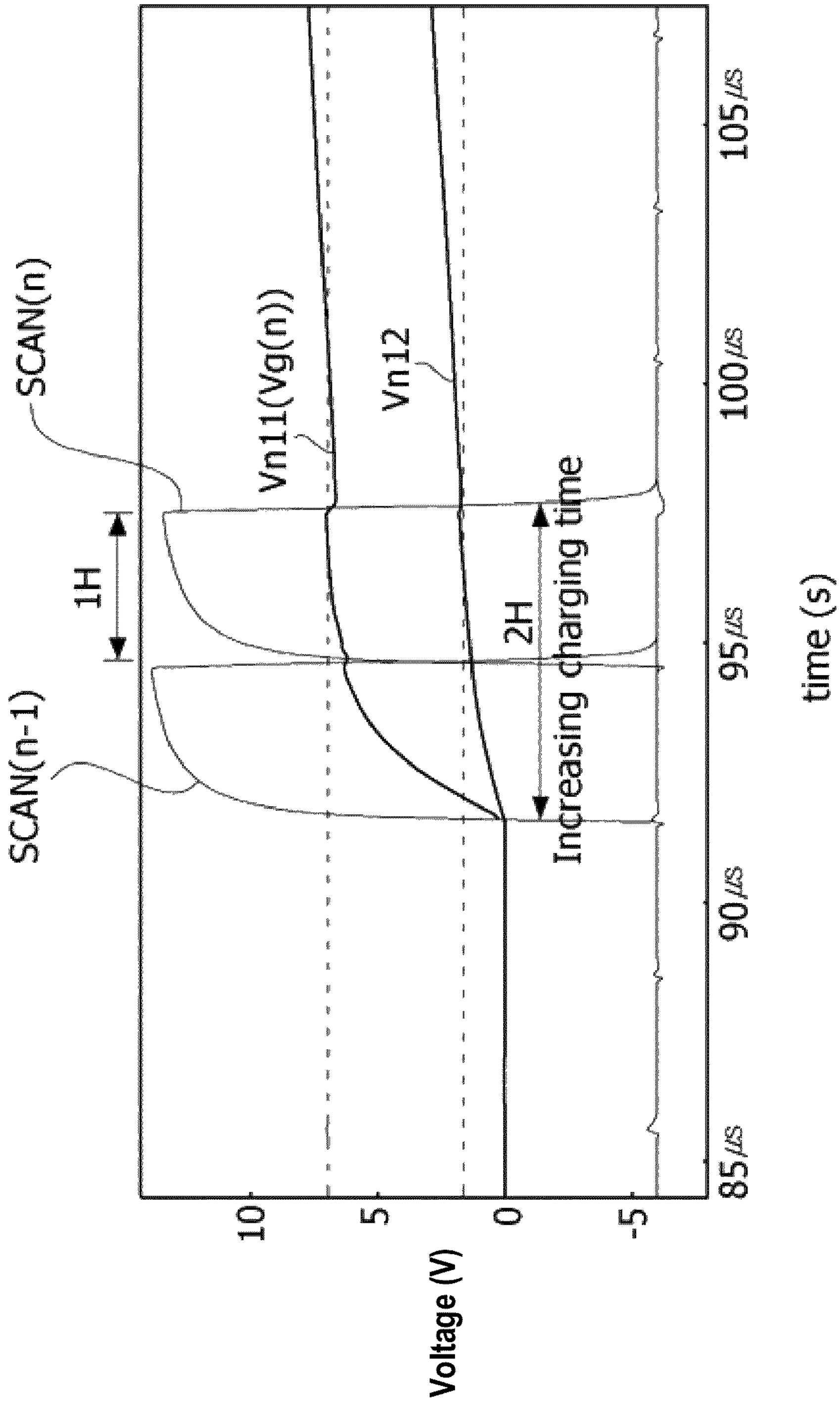
FIG. 11 is a waveform diagram obtained by measuring scan signals applied to the pixel circuit shown in FIG. 10 and voltages of major nodes in the simulation according to one embodiment of the present disclosure.

FIG. 11 is a waveform diagram obtained by measuring a scan signal applied to the pixel circuit and voltages of major nodes shown in FIG. 10 in the simulation according to one embodiment of the present disclosure. In FIG. 11, the horizontal axis represents time(s), and the vertical axis represents voltage (V). In this simulation, when the (n−1)th and (n)th scan signals SCAN(n−1) and SCAN(n) as shown in FIG. 7A are applied to the pixel circuit of the (n)th pixel line L(n), the voltage Vn11 of the first node n11 and the voltage Vn12 of the second node n12 are measured. The voltage Vn11 of the first node n11 is equal to the gate voltage Vg (n) of the driving transistor DR. As shown in FIG. 11, the charging time of a voltage applied to a gate electrode of the driving transistor DR is longer than the pulse width of each of the scan signals SCAN(n−1) and SCAN(n). Accordingly, even if the pulses of the scan signals SCAN(n−1) and SCAN(n) do not overlap, the voltage charging time of the first node n11 connected to the gate electrode of the driving transistor DR may be increased by twice the pulse width of the scan signals SCAN(n−1) and SCAN(n).

Figure 12:
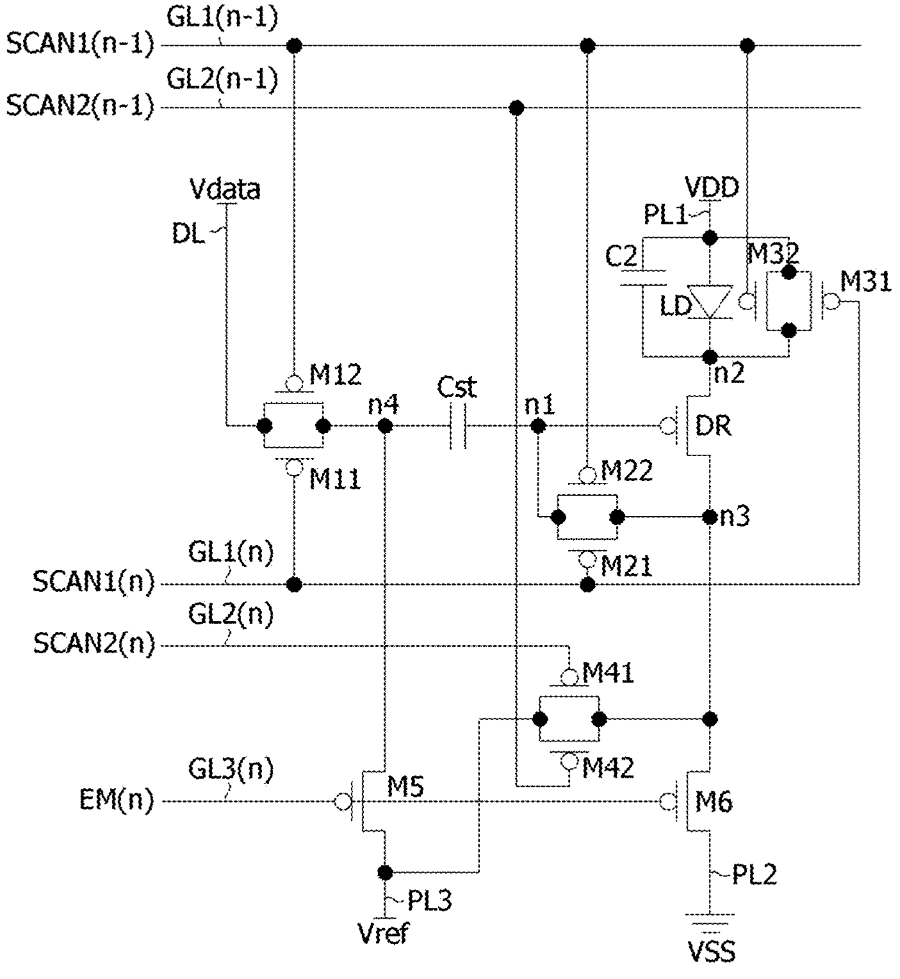
FIG. 12 is a circuit diagram illustrating a pixel circuit according to another embodiment of the present disclosure.

The pixel circuit may include an internal compensation circuit as illustrated in FIG. 12. The internal compensation circuit samples a threshold voltage of the driving element DT for each sub-pixel embedded in a pixel circuit of the sub-pixels, and compensates for a gate-source voltage of the driving element DT by the threshold voltage.

Figure 13:
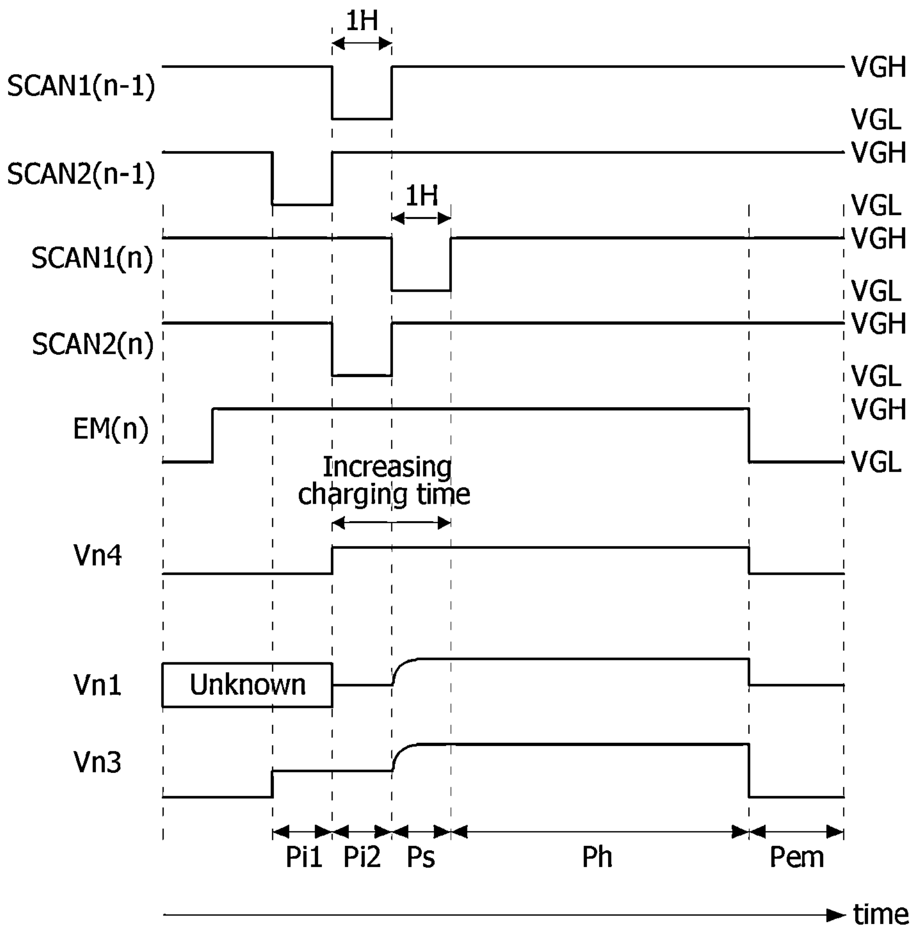
FIG. 13 is a waveform diagram illustrating signals applied to the pixel circuit shown in FIG. 12 according to one embodiment of the present disclosure.
Figure 14A:
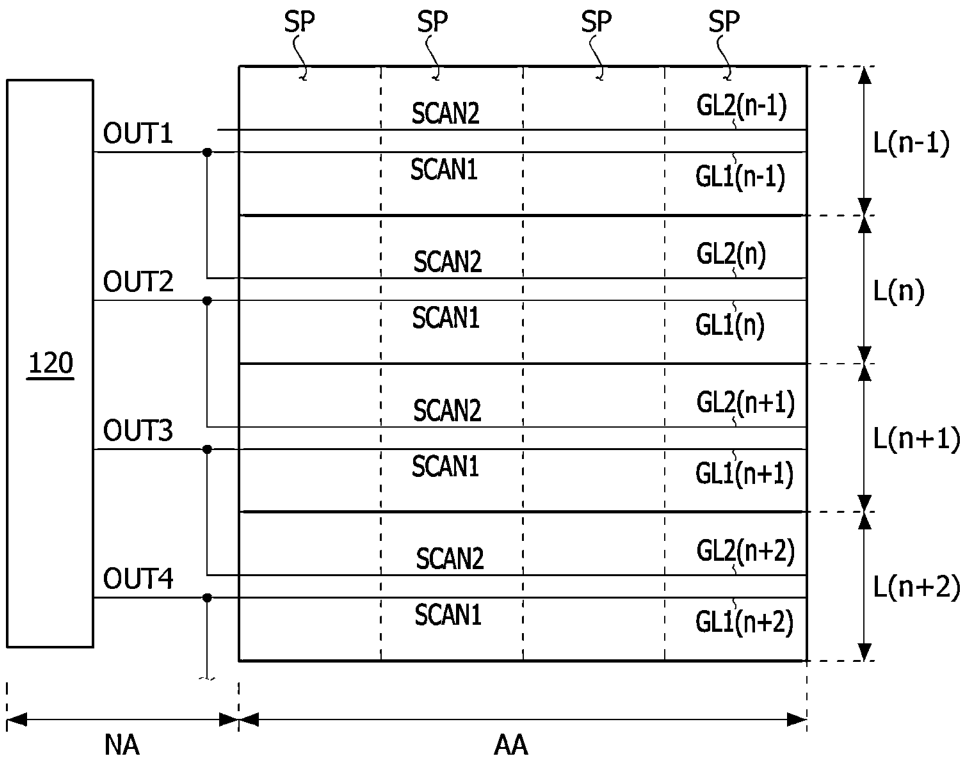
FIGS. 14A and 14B are diagrams illustrating gate lines having a parallel connection structure according to one embodiment of the present disclosure.
Figure 14B:
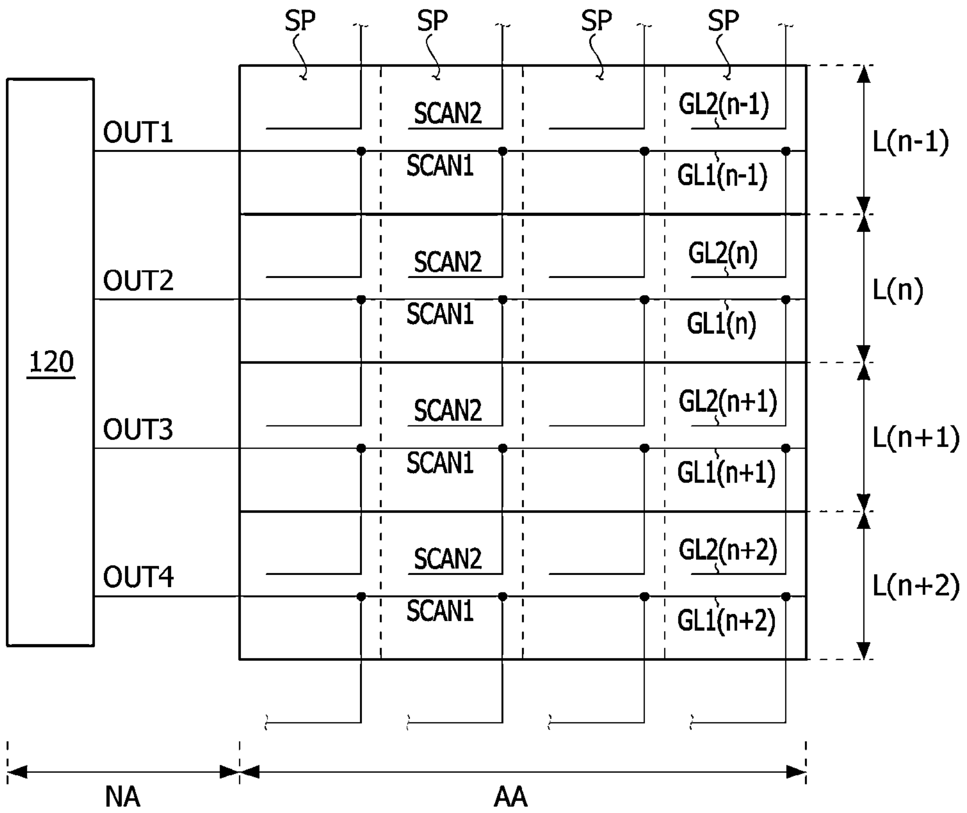

FIG. 12 is a circuit diagram illustrating a pixel circuit according to another embodiment of the present disclosure. FIG. 13 is a waveform diagram illustrating a signal applied to the pixel circuit illustrated in FIG. 12 according to one embodiment of the present disclosure. FIGS. 14A and 14B are diagrams illustrating examples of gate lines to which the scan signal illustrated in FIG. 12 is applied according to one embodiment of the present disclosure. In the embodiments, descriptions overlapping those of the above-described embodiments are omitted.

Referring to FIGS. 12 and 13, the pixel circuit may include a driving transistor DR driving the light-emitting element LD, a plurality of switch transistors M11 to M6, and a first capacitor Cst. The pixel circuit may further include a second capacitor C2. The transistors DR and M11 to M6 of the pixel circuit may be p-channel transistors, but are not limited thereto.

The pixel circuit may be connected to a data line DL to which the data voltage Vdata of pixel data is applied, gate lines GL1(n−1) to GL2(n) to which scan signals SCAN1 (n−1) to SCAN2(n) are applied, a fifth gate line GL3(n) to which an EM signal EM(n) is applied, a first power line PL1 to which a pixel driving voltage VDD is applied, a second power line PL2 to which a ground voltage VSS is applied, and a third power line PL3 to which a reference voltage Vref is applied. One example of the voltages applied to the pixel circuit may be Vdata=0V to 10V, VDD=9.5V, VSS=0V, Vref=2V, VGH=13V, and VGL=−7V, but is not limited thereto.

The scan signals SCAN1(n−1) to SCAN2(n) include a first scan signal SCAN2(n−1) applied to a first gate line GL2(n−1), a second scan signal SCAN2(n) applied to a second gate line GL2(n), a third scan signal SCAN1(n−1) applied to a third gate line GL1(n−1), and a fourth scan signal SCAN1(n) applied to a fourth gate line GL1(n). The pulses of the scan signals SCAN1(n−1) to SCAN2(n) may be generated and non-overlapped in the order of the first scan signal SCAN2(n−1), the second and third scan signals SCAN2(n), SCAN1(n−1), and the fourth scan signal SCAN1(n) as illustrated in FIG. 13, but are not limited thereto. The pulse width of each of the scan signals SCAN1 (n−1) to SCAN2(n)) may be 1 horizontal period 1H, but are not limited thereto. For example, pulses of scan signals are generated in the order of the first scan signal SCAN2(n−1), the second and third scan signals SCAN2(n), SCAN1(n−1), and the fourth scan signal SCAN1(n), but continuous pulses may overlap as shown in the example shown in FIG. 6B. The pulses of the second scan signal SCAN2(n) and the third scan signal SCAN1(n−1) may be simultaneously generated as an in-phase pulse.

The anode electrode of the light-emitting element LD may be connected to the first power line PL1 to which the pixel driving voltage VDD is applied. The cathode electrode of the light-emitting element LD may be connected to the second node n2.

The driving transistor DR may include a gate electrode connected to the first node n1, a first electrode connected to the second node n2, and a second electrode connected to the third node n3. The first capacitor Cst may be connected between the first node n1 and the fourth node n4 and may be charged with a data voltage compensated for the threshold voltage Vth of the driving transistor DR in the sampling step.

The first-first and first-second switch transistors M11 and M12 may be connected between the data line DL and the fourth node n4 to be sequentially turned on in response to the gate-on voltage VGL of the third and fourth scan signals SCAN1(n−1) and SCAN1(n) which are continuously generated, and to be sequentially turned off in response to the gate-off voltage VGH of the third and fourth scan signals SCAN1(n−1) and SCAN1(n). When the first-first and first-second switch transistors M11 and M12 are turned on, the data line DL is electrically connected to the fourth node n4.

The first-first switch transistor M11 includes a first electrode connected to the data line DL, a gate electrode connected to the fourth gate line GL1(n) to which the fourth scan signal SCAN1(n) is applied, and a second electrode connected to the fourth node n4. The first-second switch transistor M12 includes a first electrode connected to the data line DL, a gate electrode connected to the third gate line GL1(n−1) to which the third scan signal SCAN1(n−1) is applied, and a second electrode connected to the fourth node n4.

The second-first and second-second switch transistors M21 and M22 are connected between the first node n1 and the third node n3 to be sequentially turned on in response to the gate-on voltage VGL of the third and fourth scan signals SCAN1(n−1) and SCAN1(n), and to be sequentially turned off in response to the gate-off voltage VGH of the third and fourth scan signals SCAN1(n−1) and SCAN1(n). When the second-first and second-second switch transistors M21 and M22 are turned on, the first node n1 is electrically connected to the third node n3.

The second-first switch transistor M21 includes a first electrode connected to the first node n1, a gate electrode connected to the fourth gate line GL1(n), and the second electrode connected to the third node n3. The second-second switch transistor M22 includes a first electrode connected to the first node n1, a gate electrode connected to the third gate line GL1(n−1), and the second electrode connected to the third node n3.

The third-first and third-second switch transistors M31 and M32 are connected between the first power line PL1 and the second node n2 to be sequentially turned on in response to the gate-on voltage VGL of the third and fourth scan signals SCAN1(n−1) and SCAN1(n), and to be sequentially turned off in response to the gate-off voltage VGH of the third and fourth scan signals SCAN1(n−1) and SCAN1(n). When the third-first and third-second switch transistors M31 and M32 are turned on, the second node n2 is connected to the first power line PL1.

The third-first switch transistor M31 includes a first electrode connected to the first power line PL1, a gate electrode connected to the fourth gate line GL1(n), and a second electrode connected to the second node n2. The third-second switch transistor M32 includes a first electrode connected to the first power line PL1, a gate electrode connected to the third gate line GL1(n−1), and a second electrode connected to the second node n2.

The fourth-first and fourth-second switch transistors M41 and M42 are connected between the third power line PL3 and the third node n3 to be sequentially turned on in response to the gate-on voltage VGL of the first and second scan signals SCAN2(n−1) and SCAN2(n), and to be sequentially turned off in response to the gate-off voltage VGH of the first and second scan signals SCAN2(n−1) and SCAN2(n). When the fourth-first and fourth-second switch transistors M41 and M42 are turned on, the third node n3 is connected to the third power line PL3.

The fourth-first switch transistor M41 includes a first electrode connected to the third power line PL3, a gate electrode connected to the second gate line GL2(n), and a second electrode connected to the third node n3. The fourth-second switch transistor M42 includes a first electrode connected to the third power line PL3, a gate electrode connected to the first gate line GL2(n−1), and a second electrode connected to the third node n3.

The fifth switch transistor M5 is turned on in response to the gate-on voltage VGL of the EM signal EM(n) and is turned off in response to the gate-off voltage VGH of the EM signal EM(n). When the fifth switch transistor M5 is turned on, the fourth node n4 may be electrically connected to the third power line PL3. The fifth switch transistor M5 includes a first electrode connected to the fourth node n4, a gate electrode connected to the fifth gate line GL3(n) to which the EM signal EM(n) is applied, and a second electrode connected to the third power line PL3.

The sixth switch transistor M6 is turned on in response to the gate-on voltage VGL of the EM signal EM(n) and is turned off in response to the gate-off voltage VGH of the EM signal EM(n). When the sixth switch transistor M6 is turned on, the third node n3 may be electrically connected to the second power line PL2. The sixth switch transistor M6 includes a first electrode connected to the third node n3, a gate electrode connected to the fifth gate line GL3(n), and a second electrode connected to the second power line PL2.

When the gate signals SCAN1(n−1) to SCAN2(n) and the EM signal EM(n) swing between the gate-on voltage VGL and the gate-off voltage VGH, capacitor coupling may occur through parasitic capacitance, and thus the voltage of the second node n2 may vary. Since the voltage of the second node n2 is the cathode voltage of the light-emitting element LD, the voltage of both ends of the light-emitting element LD may vary and the amount of current flowing through the light-emitting element LD may vary. In this case, the luminance of the sub-pixel changes. The second capacitor C2 may be connected between the first power line PL1 and the second node n2 to suppress the voltage variation of the second node n2 when the voltages of the gate signals SCAN1(n−1) to SCAN2(n) and the EM signal EM(n) vary greatly.

The scan signals SCAN1(n−1) to SCAN2(n) may be applied as overlapping pulses to sub-pixels disposed in adjacent pixel lines through the gate lines connected in parallel with each other as shown in FIGS. 14A and 14B. In FIGS. 14A and 14B, the output signals OUT1 to OUT4 output from the gate driver 120 may be simultaneously supplied to the sub-pixels SP of the adjacent pixel lines L(n−1) to L(n+2) as the overlapping pulses as shown in FIG. 6B through the gate lines GL2(n−1) to GL1(n+2) connected in parallel.

Referring to FIGS. 14A and 14B, first to fourth output signals OUT1 to OUT4, each including two horizontal periods or two consecutive pulses, may be output from the gate driver 120. One output signal OUT may be applied to the sub-pixels of two adjacent pixel lines as an overlapping scan signal. For example, the first output signal OUT1 may be applied to the sub-pixels SP of the (n−1)th pixel line L(n−1) as a scan signal SCAN1 in which the third and fourth scan signals are combined with each other through two gate lines GL1(n−1) and GL2(n) disposed in the (n−1)th and (n)th pixel lines L(n−1) and L(n), and at the same time, may be applied to the sub-pixels SP of the (n)th pixel line L(n)

as a scan signal SCAN2 in which the first and second scan signals are combined with each other. The second output signal OUT2 may be applied to the sub-pixels SP of the (n)th pixel line L(n) as the scan signal SCAN1 in which the third and fourth scan signals are combined with each other through the two gate lines GL1(n), GL2(n+1) disposed in the (n)th and (n+1)th pixel lines L(n) and L(n+1), and at the same time, may be applied to the sub-pixels SP of the (n+1)th pixel line L(n+1) as the scan signal SCAN2 in which the first and second scan signals are combined with each other.

Figure 15A:
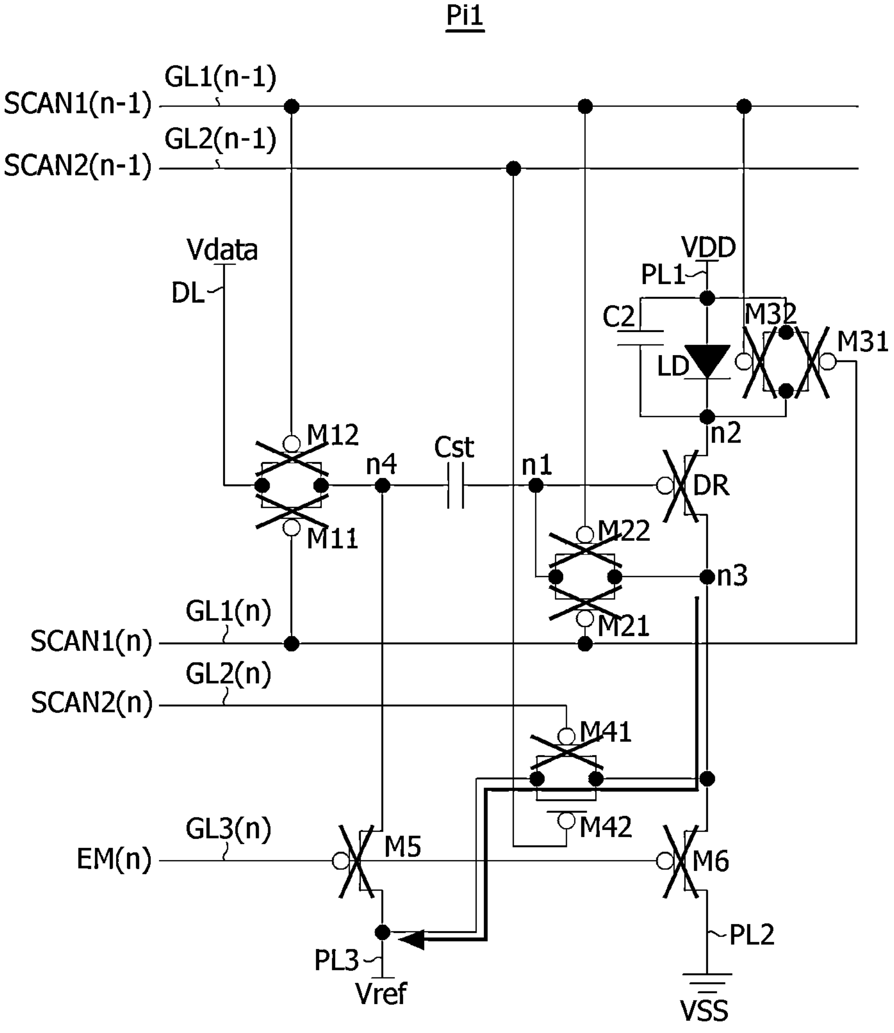
FIG. 15A is a circuit diagram illustrating a first initialization step of the pixel circuit shown in FIG. 12 according to one embodiment of the present disclosure.
Figure 15B:
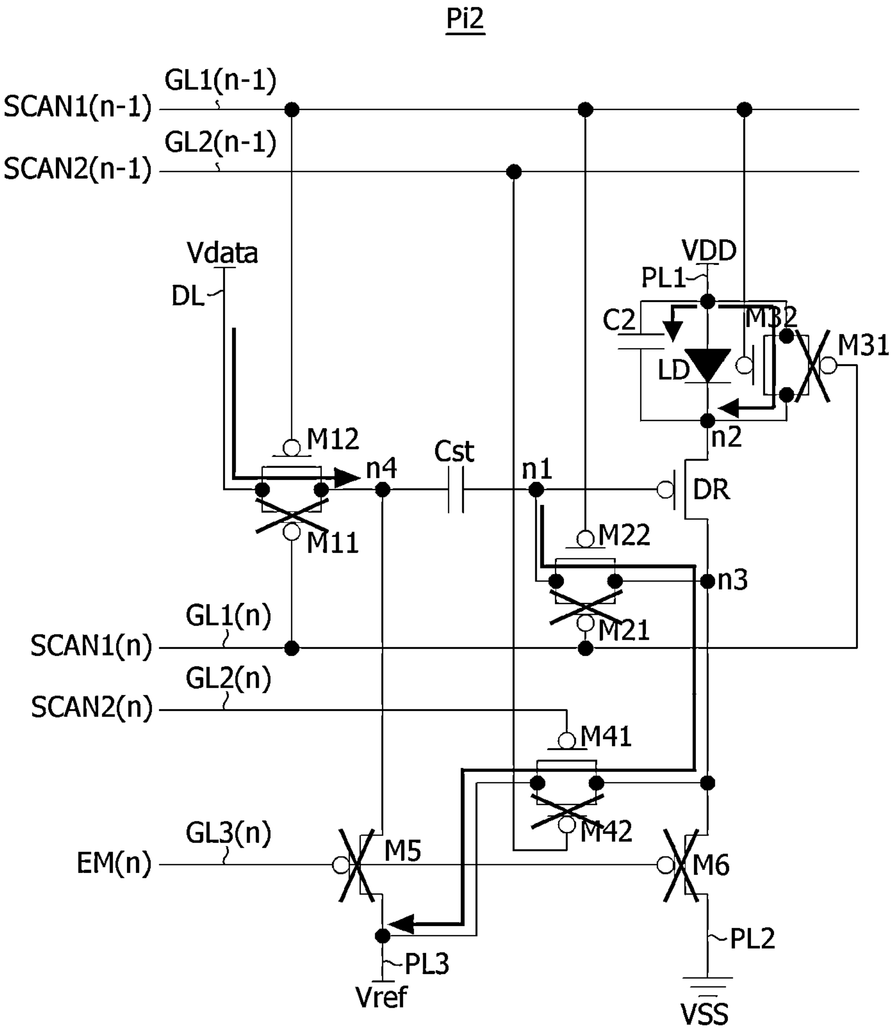
FIG. 15B is a circuit diagram illustrating a second initialization step of the pixel circuit shown in FIG. 12 according to one embodiment of the present disclosure.

The pixel circuit illustrated in FIG. 12 may be driven by an initialization step, a sampling step, a holding step, and a light emission step during a first frame period. The initialization step may be divided into a first initialization step and a second initialization step as illustrated in FIGS. 15A to 15B. In FIGS. 18A to 22B, '1H' is 1 horizontal period. An operation of the pixel circuit will be described with reference to FIGS. 18A to 22B on the assumption of a sub-pixel disposed in an (n)th pixel line.

In FIG. 13, 'Vn1' represents a voltage of the first node n1, 'Vn3' represents a voltage of the third node n3, and 'Vn4' represents a voltage of the fourth node n4. FIG. 15A is a diagram illustrating a first initialization step of the pixel circuit illustrated in FIG. 12.

Referring to FIGS. 13 and 15A, the first initialization step is performed during the first period Pi1. During the first period Pi1, a voltage of the first scan signal SCAN2(n−1) is a gate-on voltage VGL, and other scan signals SCAN2(n), SCAN1(n−1), SCAN1(n) and EM signal EM(n) may be a gate-off voltage VGH. Accordingly, while the fourth-second switch transistor M42 is turned on during the first period Pi1, other switch transistors M11 to M41, M5, and M6 are in the off state.

The fourth-second switch transistor M42 may apply the reference voltage Vref by electrically connecting the third power line PL3 to the third node n3 during the first period Pi1. During the first period Pi1, the voltage of the third node n3 is initialized to the reference voltage Vref. During the first period Pi1, voltages of the third and fourth nodes n3 and n4 may be the reference voltage Vref. During the first period Pi1, other nodes n1, n2, and n4 are floated. During the first period Pi1, the driving transistor DR is in the off state. During the first period Pi1, voltages of the first and second nodes n1 and n2 are voltages (Unknown) that have been charged in the previous frame. During the first period Pi1, a data voltage of a previous pixel line, for example, the (n−1)th pixel line L(n−1) may be applied to the data line DL.

FIG. 15B is a diagram illustrating a second initialization step of the pixel circuit shown in FIG. 12.

Referring to FIGS. 13 and 15B, the second initialization step is performed during the second period Pi2. During the second period Pi2, voltages of the second and third scan signals SCAN2(n), SCAN1(n−1) are gate-on voltages VGL, and voltages of other scan signals SCAN2(n−1), SCAN1(n) and EM signals EM(n) may be gate-off voltages VGH. Therefore, during the second period Pi2, the first-second switch transistor M12, the second-second switch transistor M22, the third-second switch transistor M32, and the fourth-first switch transistor M41 are turned on, and other switch transistors M11, M21, M31, M42, M5, and M6 are in the off state. During the second period Pi2, the voltage of the second node n2 rises to the pixel driving voltage VDD, so that the driving transistor DR is turned on.

During the second period Pi2, the data voltage Vdata of pixel data is applied to the data line DL. The data voltage Vdata is applied to the fourth node n4 through the first-second switch transistor M12. During the second period Pi2, the reference voltage Vref is applied to the first and third nodes n1 and n3 through the second-second and fourth-first switch transistors M22 and M41. Accordingly, during the second period Pi2, the voltages of the first and third nodes n1 and n3 are initialized to the reference voltage Vref, and the voltage of the fourth node n4 is the data voltage Vdata.

Figure 15C:
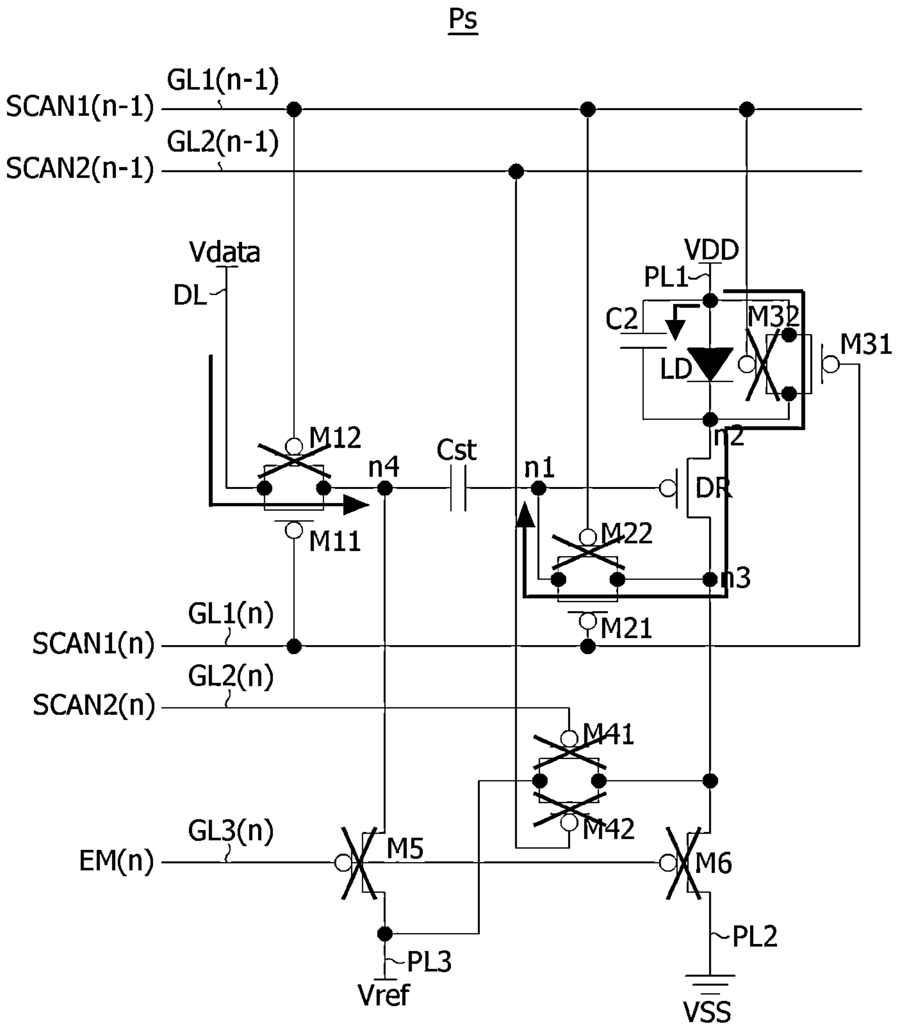
FIG. 15C is a circuit diagram illustrating a sampling step of the pixel circuit shown in FIG. 12 according to one embodiment of the present disclosure.

FIG. 15C is a diagram illustrating a sampling step of the pixel circuit shown in FIG. 12.

Referring to FIGS. 13 and 15C, the sampling step is performed during the third period Ps. During the third period Ps, a voltage of the fourth scan signal SCAN1(n) is the gate-on voltage VGL, and other scan signals SCAN2(n−1), SCAN2(n), SCAN1(n−1) and EM signal EM(n) may be the gate-off voltage VGH. Accordingly, during the third period Ps, the first-first switch transistor M11, the second-first switch transistor M21, and the third-first switch transistor M31 are turned on, whereas other switch transistors M12, M22, M32, M41, M42, M5, and M6 are in the off state. During the third period Ps, a voltage of the second node n2 is a pixel driving voltage VDD, and a voltage of the first node n1 is VDD+Vth. Here, 'Vth' is a threshold voltage of the driving transistor DR.

The driving transistor DR is in the on state when the driving transistor DR enters the third period Ps and is turned off when it reaches the off condition where (Vs−Vg)+Vth<0. Here, Vs−Vg is a gate-source voltage of the driving transistor DR, and is a difference voltage between the voltage Vs of the second node n2 and the voltage of the first node n1 where Vn1=Vg. During the third period Ps, the voltages Vn1 and Vn3 of the first and third nodes n1 and n3 rise until the driving transistor DR is turned off to reach VDD+Vth. When the third period Ps ends, the voltage of the first capacitor Cst is a data voltage, which is VDD+Vth−Vdata, compensated by the threshold voltage Vth of the driving transistor DR.

Figure 15D:
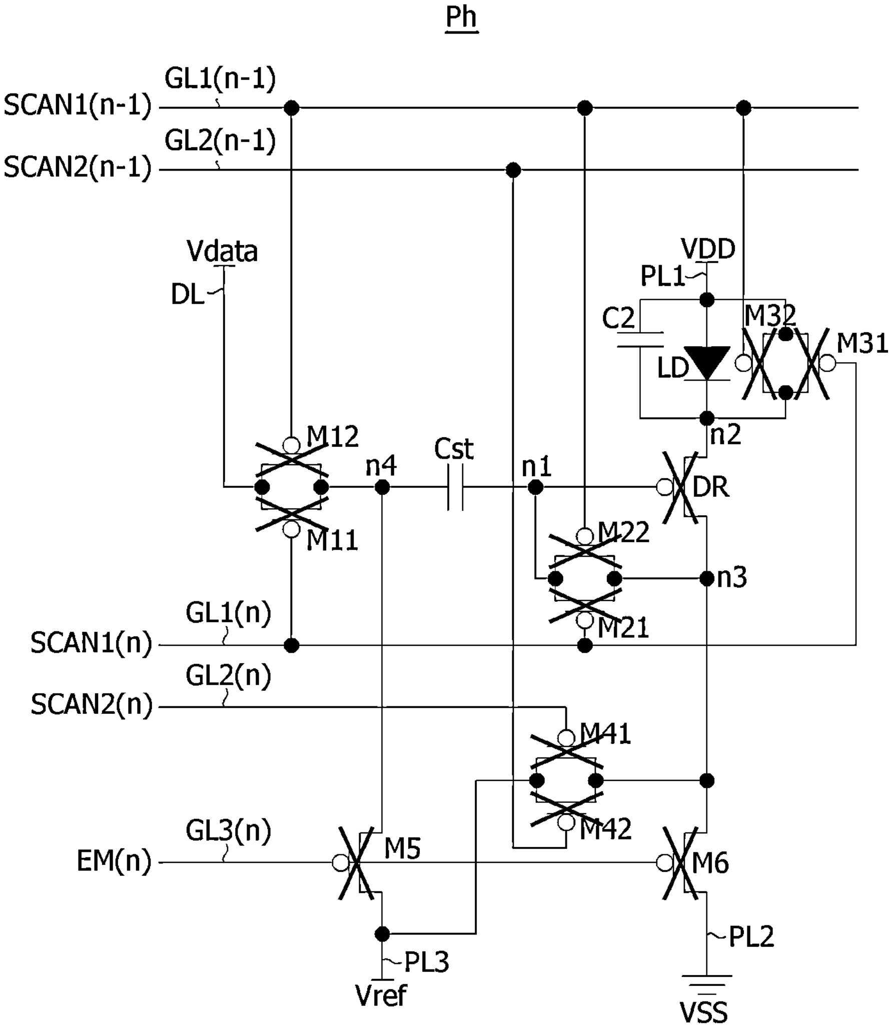
FIG. 15D is a diagram illustrating a holding step of the pixel circuit illustrated in FIG. 12 according to one embodiment of the present disclosure.

FIG. 15D is a diagram illustrating a holding step of the pixel circuit illustrated in FIG. 12.

Referring to FIGS. 13 and 15D, the holding step is performed during the fourth period Ph. During the fourth period Ph, voltages of the scan signals SCAN2(n−1), SCAN2(n), SCAN1(n−1), SCAN1(n) and EM signal EM(n) may be a gate-off voltage VGH. Accordingly, during the fourth period Ph, since the switch transistors M11 to M6 are in the off state, the second to fourth nodes n2, n3, and n4 are floated so that the voltage of the first capacitor Cst is maintained in the previous state.

Figure 15E:
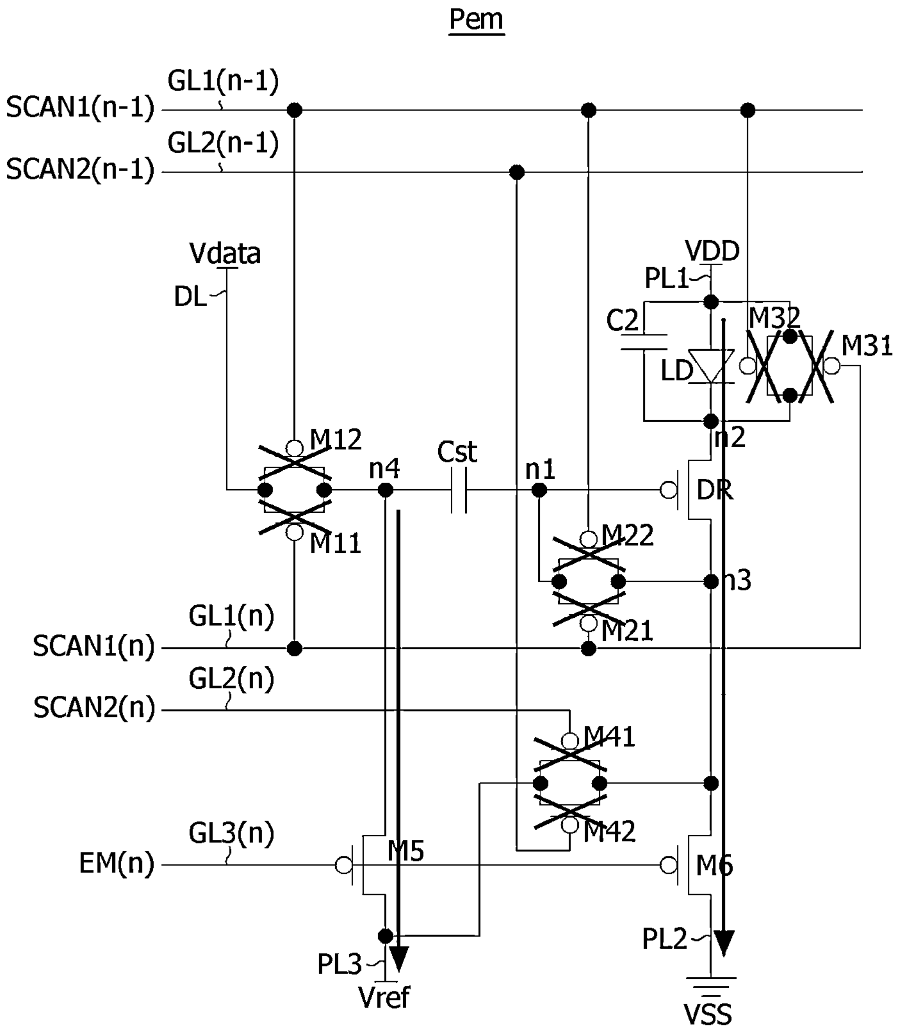
FIG. 15E is a diagram illustrating a light emission step of the pixel circuit shown in FIG. 12 according to one embodiment of the present disclosure.

FIG. 15E is a diagram illustrating a light emission step of the pixel circuit shown in FIG. 12.

Referring to FIGS. 13 and 15E, the light emission step is performed during the fifth period Pem. During the fifth period Pem, a voltage of the EM signal EM(n) may be a gate-on voltage VGL, and voltages of the scan signals SCAN2(n−1), SCAN2(n), SCAN1(n−1), and SCAN1(n) may be a gate-off voltage VGH. Accordingly, during the fifth period Pem, the fifth and sixth switch transistors M5 and M6 are turned on, while other switch transistors M11 to M42 are turned off.

In the fifth period Pem, the voltage Vn4 of the fourth node n4 changes to the reference voltage Vref, and the voltage Vn1 of the first node n1 changes to VDD+Vth+ (Vref−Vdata). In the fifth period Pem, the driving transistor DR generates a current according to the gate-source voltage Vgs to drive the light-emitting element LD. The light-emitting element LD emits light by the current ILD from the driving transistor DR during the fifth period Pem. The current ILD flowing through the light-emitting element LD is as follows.

$$\begin{aligned} I_{LD} &= \frac{1}{2}\mu C_{ox}\frac{W}{L}(V_s - V_g + V_{th})^2 \\ &= \frac{1}{2}\mu C_{ox}\frac{W}{L}(VDD - (VDD + V_{th} - (V_{data} - V_{ref})) + V_{th})^2 \\ &= \frac{1}{2}\mu C_{ox}\frac{W}{L}(VDD - VDD - V_{th} + V_{data} - V_{ref} + V_{th})^2 \\ &= \frac{1}{2}\mu C_{ox}\frac{W}{L}(V_{data} - V_{ref})^2 \end{aligned}$$

Wherein, Vs is a source voltage of the driving transistor DR or a voltage of the second node n2, and Vg is a gate voltage of the driving transistor DR or a voltage Vn1 of the first node n1.

$$\mu C_{ox}\frac{W}{L}$$

is a constant value determined by mobility μ, channel capacitance Cox, channel width W, channel length L, and the like of the driving transistor DR. Vth is a threshold voltage of the driving transistor DR.

As may be seen above, the light-emitting element LD may be driven in a light emission step where the threshold voltage Vth of the drive transistor DR is compensated so that it is not affected by changes in the threshold voltage Vth, and is not affected by RC delays or IR drops in the pixel drive voltage VDD.

Figure 16:
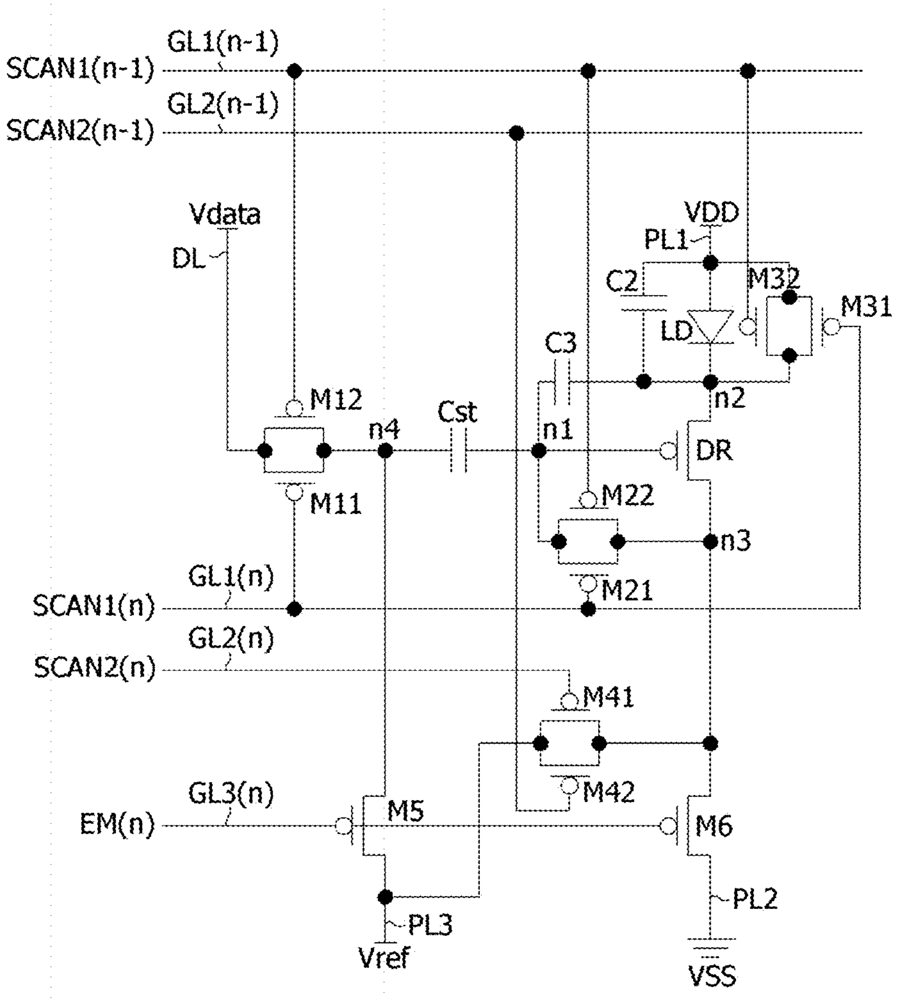
FIG. 16 is a circuit diagram illustrating a pixel circuit according to another embodiment of the present disclosure.

FIG. 16 is a circuit diagram illustrating a pixel circuit according to another embodiment of the present disclosure. The pixel circuit may be driven in an initialization step, a sampling step, a holding step, and a compensation step when the gate signals illustrated in FIG. 13 are applied. In the embodiments, substantially the same components as those of the pixel circuit illustrated in FIGS. 12 to 15F are denoted by the same reference numerals, and redundant descriptions thereof are omitted.

Referring to FIG. 16, the pixel circuit may further include a third capacitor C3. The third capacitor C3 is formed between the first node n1 and the second node n2 and may reduce the transfer rate of the data voltage Vdata transmitted from the first node n1 to the second node n2, thereby improving grayscale expressiveness.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit comprising:

a light-emitting element;

a driving transistor electrically connected to the light-emitting element;

a first-first switch transistor connected between a gate electrode of the driving transistor and a data line to which a data voltage is applied, the first-first switch transistor configured to be turned on in response to a pulse of a second scan signal; and a first-second switch transistor connected between a gate electrode of the driving transistor and the data line, the first-second switch transistor configured to be turned on in response to a pulse of a first scan signal that is input prior to the pulse of the second scan signal, wherein:

the gate electrode of the driving transistor is connected to a first node, the driving transistor includes a first electrode connected to a second node and a second electrode to which a ground voltage is applied, the light-emitting element includes an anode electrode to which a pixel driving voltage is applied, and a cathode electrode connected to the second node, and a voltage charging time of the first node is longer than a pulse width of each of the first scan signal and the second scan signal.

2. The pixel circuit of claim 1, wherein the first-first switch transistor is turned on after the first-second switch transistor is turned on, and then the first-first switch transistor is turned off after the first-second switch transistor is turned off.

3. The pixel circuit of claim 1, wherein the pulse of the first scan signal and the pulse of the second scan signal overlap or do not overlap each other.

4. The pixel circuit of claim 1, further comprising:

a second-first switch transistor connected between a power line to which a reference voltage is applied and the second node, the second-first switch transistor configured to be turned on in response to the pulse of the second scan signal; and a second-second switch transistor connected between the power line and the second node, the second-second switch transistor configured to be turned on in response to the pulse of the first scan signal, wherein the second-first switch transistor is turned on after the second-second switch transistor is turned on, and then the second-first switch transistor is turned off after the second-second switch transistor is turned off.

5. A pixel circuit comprising:

a driving transistor including a gate electrode connected to a first node, a first electrode connected to a second node, and a second electrode connected to a third node;

a light-emitting element including an anode electrode to which a pixel driving voltage is applied and a cathode electrode connected to the second node;

a first capacitor connected to the first node and a fourth node;

a first-first switch transistor connected to a data line to which a data voltage is applied and the fourth node, the first-first switch transistor configured to be turned on in response to a pulse of a fourth scan signal;

a first-second switch transistor connected to the data line and the fourth node, the first-second switch transistor configured to be turned on in response to a pulse of a third scan signal that is input prior to the pulse of the fourth scan signal;

a second-first switch transistor connected to the first node and the third node, the second-first switch transistor configured to be turned on in response to the pulse of the fourth scan signal; and a second-second switch transistor connected to the first node and the third node, the second-second switch transistor configured to be turned on in response to the pulse of the third scan signal.

6. The pixel circuit of claim 5, wherein the pulse of the third scan signal and the pulse of the fourth scan signal overlap or do not overlap each other, and a voltage charging time of the fourth node is longer than a pulse width of each of the third scan signal and the fourth scan signal.

7. The pixel circuit of claim 5, further comprising:

a third-first switch transistor connected to a first power line to which the pixel driving voltage is applied and the second node, the third-first switch transistor configured to be turned on in response to the pulse of the fourth scan signal; and a third-second switch transistor connected to the first power line and the second node, the third-second switch transistor configured to be turned on in response to the pulse of the third scan signal.

8. The pixel circuit of claim 6, further comprising:

a fourth-first switch transistor connected to a third power line to which a reference voltage is applied and the third node, the fourth-first switch transistor configured to be turned on in response to a pulse of a second scan signal;

a fourth-second switch transistor connected to the third power line and the third node, the fourth-second switch transistor configured to be turned on in response to a pulse of a first scan signal input prior to the second scan signal;

a fifth switch transistor connected to the fourth node and the third power line, the fifth switch transistor configured to be turned on in response to an emission signal; and a sixth switch transistor connected to a second power line to which a ground voltage is applied and the third node, the sixth switch transistor configured to be turned on in response to the emission signal.

9. A display device comprising:

a display panel including a plurality of data lines, a plurality of gate lines, a plurality of power lines, and a plurality of sub-pixels;

a data driver configured to output a data voltage to the plurality of data lines; and a gate driver configured to output a scan signal to the plurality of gate lines, wherein each of the plurality of sub-pixels includes:

a light-emitting element;

a driving transistor electrically connected to the light-emitting element;

a first-first switch transistor connected to a gate electrode of the driving transistor and a data line from the plurality of data lines to which the data voltage is applied, the first-first switch transistor configured to be turned on in response to a pulse of a second scan signal; and a first-second switch transistor connected to the gate electrode of the driving transistor and the data line, the first-second switch transistor configured to be turned on in response to a pulse of a first scan signal that is input prior to the pulse of the second scan signal, wherein:

the gate electrode of the driving transistor is connected to a first node, the driving transistor includes a first electrode connected to a second node and a second electrode to which a ground voltage is applied, the light-emitting element includes an anode electrode to which a pixel driving voltage is applied, and a cathode electrode connected to the second node, and a voltage charging time of the first node is longer than a pulse width of each of the first scan signal and the second scan signal.

10. The display device of claim 9, wherein the first-first switch transistor is turned on after the first-second switch transistor is turned on, and then the first-first switch transistor is turned off after the first-second switch transistor is turned off, and wherein the pulse of the first scan signal and the pulse of the second scan signal overlap or do not overlap each other.

11. The display device of claim 9, further comprising:

a second-first switch transistor connected to a power line from the plurality of power lines to which a reference voltage is applied and the second node, the second-first switch transistor configured to be turned on in response to the pulse of the first scan signal; and a second-second switch transistor connected to the power line and the second node, the second-second switch transistor configured to be turned on in response to the pulse of the second scan signal, wherein the second-first switch transistor is turned on after the second-second switch transistor is turned on, and then the second-first switch transistor is turned off after the second-second switch transistor is turned off.

12. A display device comprising:

a display panel including a plurality of data lines, a plurality of gate lines, a plurality of power lines, and a plurality of sub-pixels;

a data driver configured to output a data voltage to the plurality of data lines; and a gate driver configured to output a scan signal to the plurality of gate lines, wherein each of the plurality of sub-pixels includes:

a driving transistor including a gate electrode connected to a first node, a first electrode connected to a second node, and a second electrode connected to a third node;

a light-emitting element including an anode electrode to which a pixel driving voltage is applied and a cathode electrode connected to the second node;

a first capacitor connected to the first node and a fourth node;

a first-first switch transistor connected to a data line from the plurality of data lines to which the data voltage is applied and the fourth node, the first- first switch transistor configured to be turned on in response to a pulse of a fourth scan signal;

a first-second switch transistor connected to the data line and the fourth node, the first-second switch transistor configured to be turned on in response to a pulse of a third scan signal that is input prior to the pulse of the fourth scan signal;

a second-first switch transistor connected to the first node and the third node, the second-first switch transistor configured to be turned on in response to the pulse of the fourth scan signal;

a second-second switch transistor connected to the first node and the third node, the second-second switch transistor configured to be turned on in response to the pulse of the third scan signal;

a third-first switch transistor connected to a first power line to which the pixel driving voltage is applied and the second node, the third-first switch transistor configured to be turned on in response to the pulse of the fourth scan signal;

a third-second switch transistor connected to the first power line and the second node, the third-second switch transistor configured to be turned on in response to the pulse of the third scan signal;

a fourth-first switch transistor connected to a third power line to which a reference voltage is applied and the third node, the fourth-first switch transistor configured to be turned on in response to a pulse of a second scan signal; and a fourth-second switch transistor connected to the third power line and the third node, the fourth-second switch transistor configured to be turned on in response to a pulse of a first scan signal that is input prior to the second scan signal.

13. The display device of claim 12, wherein the pulse of the third scan signal and the pulse of the fourth scan signal overlap or do not overlap each other, and a voltage charging time of the fourth node is longer than a pulse width of each of the third scan signal and the fourth scan signal.

14. The display device of claim 12, wherein the pulse of the first scan signal and the pulse of the second scan signal overlap or do not overlap each other.

15. The display device of claim 12, wherein the plurality of gate lines include:

a first gate line to which the first scan signal is input;

a second gate line to which the second scan signal is input;

a third gate line to which the third scan signal is input; and a fourth gate line to which the fourth scan signal is input, and wherein each of the first gate line to the fourth gate line is connected in parallel to a corresponding output terminal of the gate driver.

16. The display device of claim 12, further comprising:

a fifth switch transistor connected to the fourth node and the third power line, the fifth switch transistor configured to be turned on in response to an emission signal; and a sixth switch transistor connected to a second power line to which a ground voltage is applied and the third node, the sixth switch transistor configured to be turned on in response to the emission signal, wherein the gate driver outputs the emission signal.

* * * * *